United States Patent [19]
Lee

[11] Patent Number: 6,122,283
[45] Date of Patent: Sep. 19, 2000

[54] METHOD FOR OBTAINING A LOSSLESS COMPRESSED AGGREGATION OF A COMMUNICATION NETWORK

[75] Inventor: Whay Chiou Lee, Cambridge, Mass.

[73] Assignee: Motorola Inc., Schaumburg, Ill.

[21] Appl. No.: 08/742,307

[22] Filed: Nov. 1, 1996

[51] Int. Cl.[7] .................................................. H04J 3/24
[52] U.S. Cl. ..................... 370/408; 370/256; 370/395; 370/400
[58] Field of Search ................................ 370/395, 397, 370/400, 408, 413, 414, 465, 468, 401, 409, 255, 256, 390

[56] References Cited

U.S. PATENT DOCUMENTS

| 5,301,055 | 4/1994 | Bagchi et al. | 370/395 |
| 5,347,511 | 9/1994 | Gun | 370/400 |
| 5,367,520 | 11/1994 | Cordell | 370/414 |
| 5,535,195 | 7/1996 | Lee | 370/408 |

OTHER PUBLICATIONS

Lee, Whay Chiou. "Spanning Tree Method for Link State Aggregation in Large Communication Networks," IEEE INFOCOM'95, 0743–166X/95. pp. 297–302 (1995).

Lee, Whay Chiou. "Topology Aggregation for Hierarchical Routing in ATM Networks," ACM SIGCOMM Computer Communication Review, Special Issue on ATM, vol. 25, No. 2, Apr. 1995. pp. 82–92.

Pegleg, David; Schäffer, Alejandro A. "Graph Spanners," Jornal of Graph Theory, vol. 13, No. 1, 99–116 (1989), John Wiley Y Sons, Inc. pp. 99–116.

Althöfer, Ingo; Das, Gautam; Dobkin, David; Joseph, Deborah; Soares, José. "On Sparse Spanners of Weighted Graphs," Discrete Computational Geometry, 1993 Springer–Verlag, New York, 1993.

Tarjan, Robert Endre. "Data Structures and Network Algorithms," Society for Industrial and Applied Mathematics, Philadelphia, PA 1983. pp. 85–96.

*Primary Examiner*—Douglas W. Olms
*Assistant Examiner*—Shick Hom
*Attorney, Agent, or Firm*—James A. Coffing; Terri S. Hughes; Joanne N. Pappas

[57] ABSTRACT

A method for providing a lossless, compressed topology aggregation of a group of switching nodes and interconnecting links. The switching nodes are divided into border vertices having communications with other networks or subnetworks and interior vertices. The method determines non-redundant optimal paths between different pairs of border vertices. These paths are aggregated for storage at individual border switching nodes to enable the characteristic, metric or attribute to be advertised outside of the subnetwork or peer group.

32 Claims, 16 Drawing Sheets

$$S = \{\ \};\ d'(u,v) = c(u,v)$$

| d'(u,v)<br>p(u,v)<br>f(u,v) | A | B | C | D | E | F | G | H |
|---|---|---|---|---|---|---|---|---|
| A |  | 1<br>A<br>0 | ∞<br>NULL<br>0 | ∞<br>NULL<br>0 | 2<br>A<br>0 | 2<br>A<br>0 | ∞<br>NULL<br>0 | ∞<br>NULL<br>0 |
| B | 1<br>B<br>0 |  | ∞<br>NULL<br>0 | ∞<br>NULL<br>0 | ∞<br>NULL<br>0 | ∞<br>NULL<br>0 | 2<br>B<br>0 | 1<br>B<br>0 |
| C | ∞<br>NULL<br>0 | ∞<br>NULL<br>0 |  | 2<br>C<br>0 | 2<br>C<br>0 | ∞<br>NULL<br>0 | 1<br>C<br>0 | ∞<br>NULL<br>0 |
| D | ∞<br>NULL<br>0 | ∞<br>NULL<br>0 | 2<br>D<br>0 |  | ∞<br>NULL<br>0 | ∞<br>NULL<br>0 | 5<br>D<br>0 | 1<br>D<br>0 |
| E | 2<br>E<br>0 | ∞<br>NULL<br>0 | 2<br>E<br>0 | ∞<br>NULL<br>0 |  | 4<br>E<br>0 | ∞<br>NULL<br>0 | ∞<br>NULL<br>0 |
| F | 2<br>F<br>0 | ∞<br>NULL<br>0 | ∞<br>NULL<br>0 | ∞<br>NULL<br>0 | 4<br>F<br>0 |  | 1<br>F<br>0 | ∞<br>NULL<br>0 |
| G | ∞<br>NULL<br>0 | 2<br>G<br>0 | 1<br>G<br>0 | 5<br>G<br>0 | ∞<br>NULL<br>0 | 1<br>G<br>0 |  | ∞<br>NULL<br>0 |
| H | ∞<br>NULL<br>0 | 1<br>H<br>0 | ∞<br>NULL<br>0 | 1<br>H<br>0 | ∞<br>NULL<br>0 | ∞<br>NULL<br>0 | ∞<br>NULL<br>0 |  |

*FIG. 20*

$S = \{ E, F, G, H \}; \quad d'(u,v) = d'''(u,v)$

| d'(u,v)<br>p(u,v)<br>f(u,v) | A | B | C | D | E | F | G | H |
|---|---|---|---|---|---|---|---|---|
| A |  | 1<br>A<br>0 | 4*<br>E<br>0 | 8*<br>G<br>0 | 2<br>A<br>0 | 2<br>A<br>0 | 3*<br>F<br>0 | ∞<br>NULL<br>0 |
| B | 1<br>B<br>0 |  | 3*<br>G<br>0 | 2*<br>H<br>0 | 7*<br>F<br>0 | 3*<br>G<br>0 | 2<br>B<br>0 | 1<br>B<br>0 |
| C | 4*<br>E<br>0 | 3*<br>G<br>0 |  | 2<br>C<br>0 | 2<br>C<br>0 | 2*<br>G<br>0 | 1<br>C<br>0 | ∞<br>NULL<br>0 |
| D | 8*<br>F<br>0 | 2*<br>H<br>0 | 2<br>D<br>0 |  | 10*<br>F<br>0 | 6*<br>G<br>0 | 5<br>D<br>0 | 1<br>D<br>0 |
| E | 2<br>E<br>0 | 7*<br>G<br>0 | 2<br>E<br>0 | 10*<br>G<br>0 |  | 4<br>E<br>0 | 5*<br>F<br>0 | ∞<br>NULL<br>0 |
| F | 2<br>F<br>0 | 3*<br>G<br>0 | 2*<br>G<br>0 | 6*<br>G<br>0 | 4<br>F<br>0 |  | 1<br>F<br>0 | ∞<br>NULL<br>0 |
| G | 3*<br>F<br>0 | 2<br>G<br>0 | 1<br>G<br>0 | 5<br>G<br>0 | 5*<br>F<br>0 | 1<br>G<br>0 |  | ∞<br>NULL<br>0 |
| H | ∞<br>NULL<br>0 | 1<br>H<br>0 | ∞<br>NULL<br>0 | 1<br>H<br>0 | ∞<br>NULL<br>0 | ∞<br>NULL<br>0 | ∞<br>NULL<br>0 |  |

| d'(u,v)<br>p(u,v)<br>f(u,v) | A | B | C | D | E | F | G | H |
|---|---|---|---|---|---|---|---|---|
| A |   | 1<br>A<br>0 | 4*<br>G<br>1 | 3*<br>H<br>1 | 2<br>A<br>0 | 2<br>A<br>0 | 3<br>F<br>0 | 2*<br>B<br>1 |
| B | 1<br>B<br>0 |   | 3<br>G<br>0 | 2<br>H<br>0 | 3*<br>A<br>1 | 3*<br>A<br>1 | 2<br>B<br>0 | 1<br>B<br>0 |
| C | 4*<br>B<br>1 | 3<br>G<br>0 |   | 2<br>C<br>0 | 2<br>C<br>0 | 2<br>G<br>0 | 1<br>C<br>0 | 3*<br>D<br>1 |
| D | 3*<br>B<br>1 | 2<br>H<br>0 | 2<br>D<br>0 |   | 4*<br>C<br>1 | 4*<br>C<br>1 | 3*<br>C<br>1 | 1<br>D<br>0 |
| E | 2<br>E<br>0 | 3*<br>A<br>1 | 2<br>E<br>0 | 4*<br>C<br>1 |   | 4*<br>A<br>1 | 3*<br>C<br>1 | 4*<br>B<br>1 |
| F | 2<br>F<br>0 | 3*<br>A<br>1 | 2<br>G<br>0 | 4*<br>C<br>1 | 4*<br>C<br>1 |   | 1<br>F<br>0 | 4*<br>B<br>1 |
| G | 3*<br>B<br>1 | 2<br>G<br>0 | 1<br>G<br>0 | 3*<br>C<br>1 | 3*<br>C<br>1 | 1<br>G<br>0 |   | 3*<br>B<br>1 |
| H | 2*<br>B<br>1 | 1<br>H<br>0 | 3*<br>D<br>1 | 1<br>H<br>0 | 4*<br>A<br>1 | 4*<br>A<br>1 | 3*<br>B<br>1 |   |

*FIG. 22*

| SET E* | SET D |
|---|---|
| e*(u,v) | d(u,v) |
| A,B | 1 |
| B,A | 1 |
| B,C | 3 |
| B,D | 2 |
| C,B | 3 |
| C,D | 2 |
| D,B | 2 |
| D,C | 2 |

*FIG. 23*

METHOD FOR OBTAINING A LOSSLESS COMPRESSED AGGREGATION OF A COMMUNICATION NETWORK

FIELD OF THE INVENTION

This invention generally relates to communication networks and more particularly to a method for obtaining a topology representation of a network in the form of a lossless compressed aggregation of optimal paths through such a network.

BACKGROUND OF THE INVENTION

Asynchronous transfer mode (ATM) networks and other communication networks comprise an array of switching nodes and interconnecting communication links. As known, there are certain costs or characteristics associated with the transfer of information through a tandem of such switching nodes and connected links. Some of these characteristics, for example, fixed delay, delay variation, and administrative weight, are cumulative. For these characteristics, sometimes referred to as "metrics", an optimal path is conventionally defined as one in which the set of tandem switching nodes and links produces the smallest cumulative value.

Other characteristics, such as bandwidth and cell loss ratio are, respectively, minimum determinative and maximum determinative of the corresponding characteristics of a path and essentially define a bottleneck. These characteristics are called "attributes". An optimal path with respect to a minimum determinative attribute such as bandwidth, is one that exhibits the largest bottleneck value along the path. An optimal path with respect to a maximum determinative attribute such as cell loss ratio is one that exhibits the smallest bottleneck value along the path. As metrics and attributes can vary from one switching node and connected link to another, there is a need to determine a path through a network that is optimal with respect to each metric and attribute, such an optimal path minimizing a metric or either maximizing or minimizing an attribute, as appropriate.

In one prior art approach, a graph for a particular characteristic, e.g., fixed delay, is defined in which a switching node is called a "vertex" and each communications link is called an "edge" that has a defined particular value. With networks comprising only a few switching nodes and communication links, a memory at each switching node can readily and practically include information about all possible paths through the network. This path information is generally produced during initialization, upon any restructuring of the network or upon any change in the network that might be caused by a failure of a particular switching node.

Today's networks, however, are increasing in both complexity and size. In ATM networks, particularly, the concept of having sufficient information at each switching node to describe optimal paths to all other switching nodes for each metric and attribute becomes unmanageable. An alternative approach defines a hierarchical network. In this approach subsets of switching nodes and communications links are arbitrarily grouped into subnetworks or "peer groups". A single logical representation, known as a logical group node, is then produced for each subnetwork or peer group. An arbitrary subset of the logical representations or logical group nodes may further be grouped into a subnetwork or peer group for the next higher level of the hierarchy. Such grouping may be repeated for an arbitrary number of levels.

In a hierarchical network, certain switching nodes in a peer group (or logical group nodes if the peer group is not at the lowest level of the hierarchy) may be connected either to other switching nodes or to logical group nodes outside the peer group; that is, they may be connected to switching nodes in other peer groups. Within a peer group, such switching nodes with external connections are referred to as border switching nodes. Switching nodes that connect only to switching nodes within the same peer group are referred to as interior switching nodes. In essence, a general approach is to obtain a representation of an optimal path for each metric and attribute between each pair of border switching nodes.

It has further been the practice to attempt to produce a topology representation of the connectivity between border switching nodes in peer groups in which the information is aggregated and compressed to reduce the quantity of data that must be retained at different switching nodes to support efficient routing from a remote source to a switching node in a peer group or through the peer group to reach a remote destination. U.S. Pat. No. 5,535,195 (1996) to the same inventor as this invention, discloses one such method for aggregating attributes, namely bandwidth, in which a peer group or subnetwork with a symmetrical bandwidth (i.e., the bandwidth is the same in both directions of a link) is converted to a full mesh virtual topology. Then a spanning tree virtual topology is generated based upon the full mesh topology for being advertised by a subnetwork leader that will typically be one of the border switching nodes. While this approach successfully represents the topology in terms of a symmetrical attribute to be maximized, it has not been found to be readily adapted in other applications, such as the representation of a subnetwork or peer group in terms of an asymmetrical attribute or a metric.

"Data Networks", Dimitri Bertsekas & Robert Gallager, Prentice Hall, 1987 (pg. 322–325) describes two well known shortest path algorithms, or methodologies, which can be used to generate a shortest path between each pair of border switching nodes in a peer group, thereby obtaining, for the peer group, topology representation in the form of a full mesh graph spanning the border switching nodes. The so-called Dijkstra methodology finds the shortest path in order of increasing path length from one node to all other nodes in the network or peer group. This approach has a computational complexity of the order $N^2$ per shortest path where N represents the total number of switching nodes in a subnetwork including border and interior switching nodes. The so-called Floyd-Warshall methodology finds the shortest path between all pairs of nodes collectively in an iterative procedure that evaluates sets of nodes that are allowed as intermediate nodes in the various paths. The Floyd-Warshall methodology has a computational complexity of an order of magnitude of $N^3$, where N again represents the total number of switching nodes in a subnetwork including both border and interior switching nodes.

Graph spanners are disclosed in "Graph Spanners", David Peleg & Alejandro A. Schäffer, Graph Spanners, Graph Theory, Vol. 13, No. 1, (pg. 99–116) for generating a topology representation in the form of an aggregation of connectivity information. "On Sparse Spanners of Weighted Graphs", Ingo Althöfer, Gautam Das, David Dobkin, Deborah Joseph & Jose Soares, Discrete Computational Geometry, Vol. 9, 1993 (pg. 81–100) discloses an approach for compressing a spanner graph subject to an upper bound on a stretch factor. According to this approach a subgraph or subnetwork is said to be a "t-spanner" if, between any pair of vertices the distance in the subgraph is at most "t" times longer than the distance in the original graph. The value of "t" is the stretch factor associated with the subgraph.

Values of "t" greater than one indicate that some information about the peer group has been lost, so certain details about the paths can not be determined This approach scans the edges of a given graph in order of nondecreasing metric values or weights. At each iteration the scanned edge is selected if there exists no alternate path in the subgraph of selected edges, such that the alternate path is shorter than or equal to t times the weight of the scanned edge. When all the edges have been scanned, the subgraph of selected edges gives a t-spanner for the original graph. While this approach successfully determines a topology representation in the form of a lossless compressed form for a peer group by letting the stretch factor assume the value of one, it is applicable only when all the switching nodes in the original topology are border nodes.

In accordance with another approach, a topology representation exists in the form of a star whose center does not correspond to any vertex in the original graph. The most primitive approach is using a star to assign a common metric value to each edge connecting the center vertex to a border vertex. A more sophisticated approach is to allow different metric values to be assigned to these edges. All existing approaches based on the star representation generally do not support graph compression subject to a stretch factor of "one" except in very special cases.

Generally, therefore, the prior art has suggested various approaches for generating a compressed aggregation that represents the topology of a peer group. In some, the maximum compression of the graph, and hence the minimization of topology information to be advertised, generates a stretch factor that is greater than one. Other approaches, while effective in some applications, have not been generally applicable for generating an aggregation for both metrics and attributes. Yet in other approaches, all nodes within a topology to be aggregated are necessarily border nodes, and there is no obvious generalization of the approaches to generate an aggregated topology for a peer group where only a subset of all nodes in the peer group are border nodes. Moreover, attempts to compress the data describing the effect of a metric or attribute has provided an inaccurate representation of the paths through a peer group.

Accordingly, there remains a need for a method for determining topology representation in the form of a lossless compressed aggregation of optimal paths in a subnetwork in a communication network, such that all the topology information that is pertinent to routing through the subnetwork is retained.

BRIEF DESCRIPTION OF THE DRAWINGS

FIGS. 17 through 20 depict details of the method of FIG. 16; and

FIGS. 21 through 23 are useful in understanding the method depicted in FIGS. 16 through 20 as applied to the graph of FIG. 1.

DETAILED DESCRIPTION OF A PREFERRED EMBODIMENT

This invention provides a topology representation in the form of lossless compressed aggregation of non-redundant optimal paths through an interconnected group of switching nodes and communication links that define a peer group. This peer group, in turn, communicates with other switching nodes via communication links. As previously indicated, each communication link, generally in combination with a connected switching node, has a given quantifiable topology characteristic, typically known as "metric" and "attribute" values.

Figure 1:
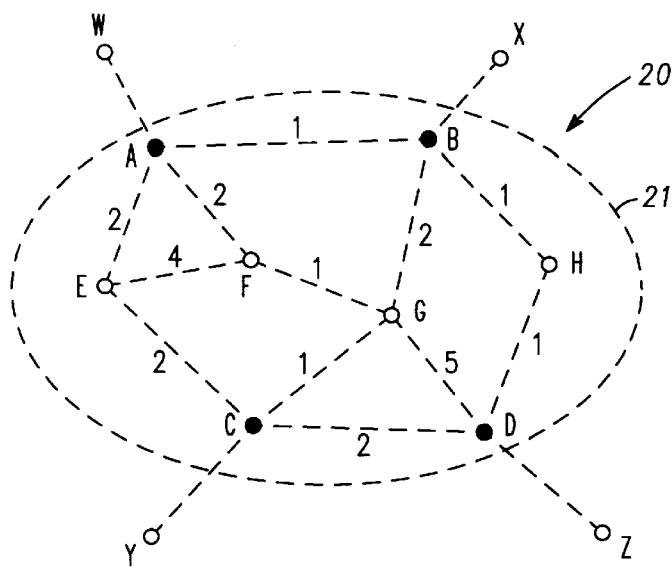
FIG. 1 graphically depicts portions of a communications network including a peer group to which this invention can be applied.

FIG. 1 depicts a graph for a portion of a communication network 20, such as a large ATM network, that includes a plurality of switching nodes A through H and W through Z and communication links. Such a communication network can include hundreds, or even thousands and more switching nodes. In a graphical representation, such as that shown in FIG. 1, it is common in the art to refer to each switching node as a "vertex" and to each communication link as an "edge". Thus, the network 20 comprises vertices A through H and W through Z. A dashed line 21 provides a boundary for the peer group of vertices A through H. The numeral adjacent each edge designates a particular metric value. Thus the edge from vertex A to vertex B has a metric value of "1" while the path from vertex E to vertex F has a metric value of "4". In practice, there will be one such representation for each different metric and attribute, or topology characteristic, for each communication link or edge.

In accordance with this invention, the vertices within the peer group 21 are segregated into "border" and "interior" vertices. A "border vertex" is one that connects to a vertex outside the peer group. Vertices A through D in FIG. 1 are border vertices or switching nodes. All other vertices within peer groups, such as peer group 21, are "interior vertices". In the context of FIG. 1, switching nodes or vertices E through H are interior switching nodes or vertices.

In the following discussion, the terms "switching node" and "communication link" are intended to refer to an apparatus included in an actual network. The terms "vertex" and "edge" are intended to refer to representations of the switching nodes and communication links, respectively. In many descriptions, the terms "switching node" and "vertex" are used interchangeably. This also applies to the terms "communications link" and "edge."

Figure 2:
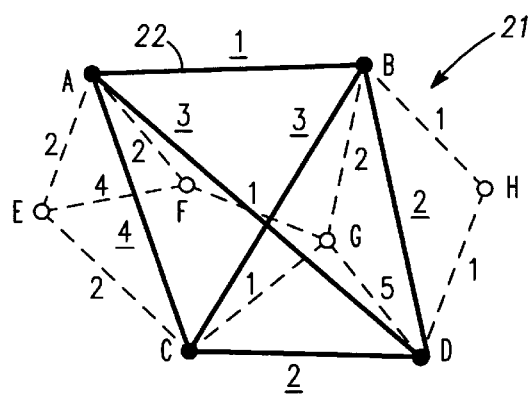
FIG. 2 depicts portions of the peer group of FIG. 1 and a corresponding prior art full mesh representation of that peer group.

After defining the border and interior vertices, the method of this invention obtains a representation of the peer group topology based upon the metric or attribute values. In some prior art methods, this information is summarized according to a shortest path criterion into a "full mesh" graph 22 corresponding to the solid lines in FIG. 2. Particularly this full mesh graph contains six edges as opposed to the twelve edges of FIG. 1. By inspection, it can be seen that the full mesh graph of FIG. 2 contains redundant information. Namely, the path on the full mesh graph of FIG. 2 between vertices A and C is, for the metric value shown, redundant with the path on the full mesh graph between vertices A and B and between vertices B and C. Consequently the path on the full mesh graph between vertices A and C could be removed without introducing any loss of topology information.

In accordance with this invention, the system initiates an iterative process in an ordered fashion toward attaining the optimal paths between the border vertices. However, as each optimal path is determined, that path is segregated into a first or second category. When the processing is completed, the saved paths in the first category are used to define the edges that are combined to provide a lossless compressed topology aggregation representing the peer group topology spanning the border vertices.

Figure 3:
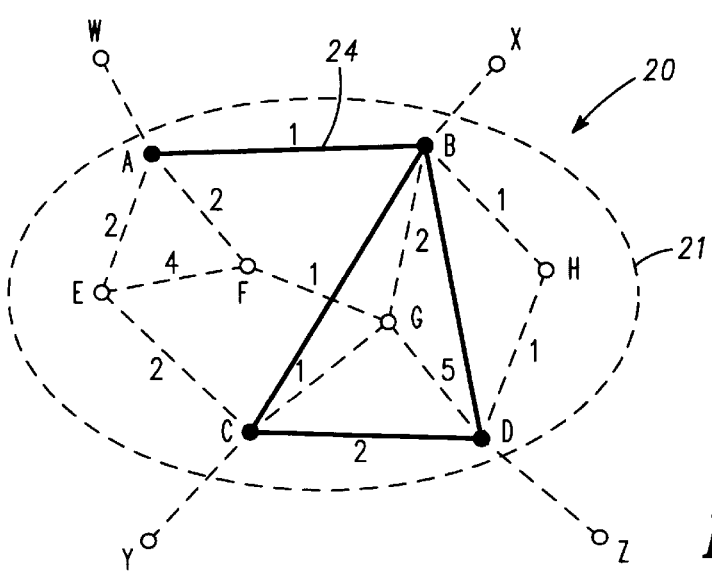
FIG. 3 depicts a graph of a lossless, compressed aggregation of the topology peer group in accordance with this invention.

FIG. 3 depicts the graph that results from this analysis and is a lossless compressed topology aggregation 24 that includes four edges, namely the edges between border vertices A and B, between border vertices B and C, between border vertices B and D and between border vertices C and D. Thus, in this particular example the number of edges that accurately define the transit routing characteristics of the peer network 21 is reduced from twelve edges in FIG. 1 and six edges in FIG. 2 to four edges in FIG. 3. This is a significant reduction in that quantity of information that must be retained at each border vertex of a peer group to advertise the characteristics of that peer group. Moreover, the information is readily converted to the full mesh form of FIG. 2. That is, the path on the full mesh graph between the border vertices A and C, which is omitted on the compressed graph, has the same metric value as the combined paths on the full mesh graph from border vertices A to B to C. Likewise the path between border vertices A through D, which is omitted on the compressed graph, can be derived from the path on the full mesh graph incorporating border vertices A, B and D.

With this background it will be helpful to review two different methods for obtaining or deriving the lossless compressed topology aggregation 24 of FIG. 3. The first is based upon the known Dijkstra methodology; the second, on the known Floyd-Warshall methodology. As known, the Dijkstra methodology is used to determine shortest paths from a given vertex (referred to as a root) to all other vertices. The Floyd-Warshall methodology determines shortest paths from each vertex to every other vertex.

In principle, one could apply the Dijkstra methodology to each vertex as a root to produce the set of shortest paths between all pairs of vertices. The Dijkstra methodology is particularly well suited for distributed computation, wherein each border switching node is responsible for computing its own non-redundant shortest path tree. The Floyd-Warshall methodology, on the other hand, is well suited for centralized computation wherein a central location or a switching node is responsible for computing the entire lossless compressed graph. Each method is modified in accordance with this invention to segregate each optimal path between different border vertices in one of two categories thereby to enable the generation of a topology representation in the form of a lossless compressed aggregation 24 of FIG. 3 by eliminating redundant information from the final aggregation.

Modified Dijkstra Methodology

As known, the Dijkstra methodology identifies the shortest paths in order of increasing path length. The shortest of the shortest paths from a given vertex must be the single edge path to the closest neighbor of that vertex, since any multiple edge path must be longer than the first edge length because it is assumed each edge has a positive length. In essence, in accordance with this system for each metric, the length of each edge or metric value is given. This value is used as an estimated distance when determining the optimal path. After each vertex is analyzed, it becomes part of a set and the process continues in an iterative fashion until all the vertices have been transferred into the set.

Figure 4:
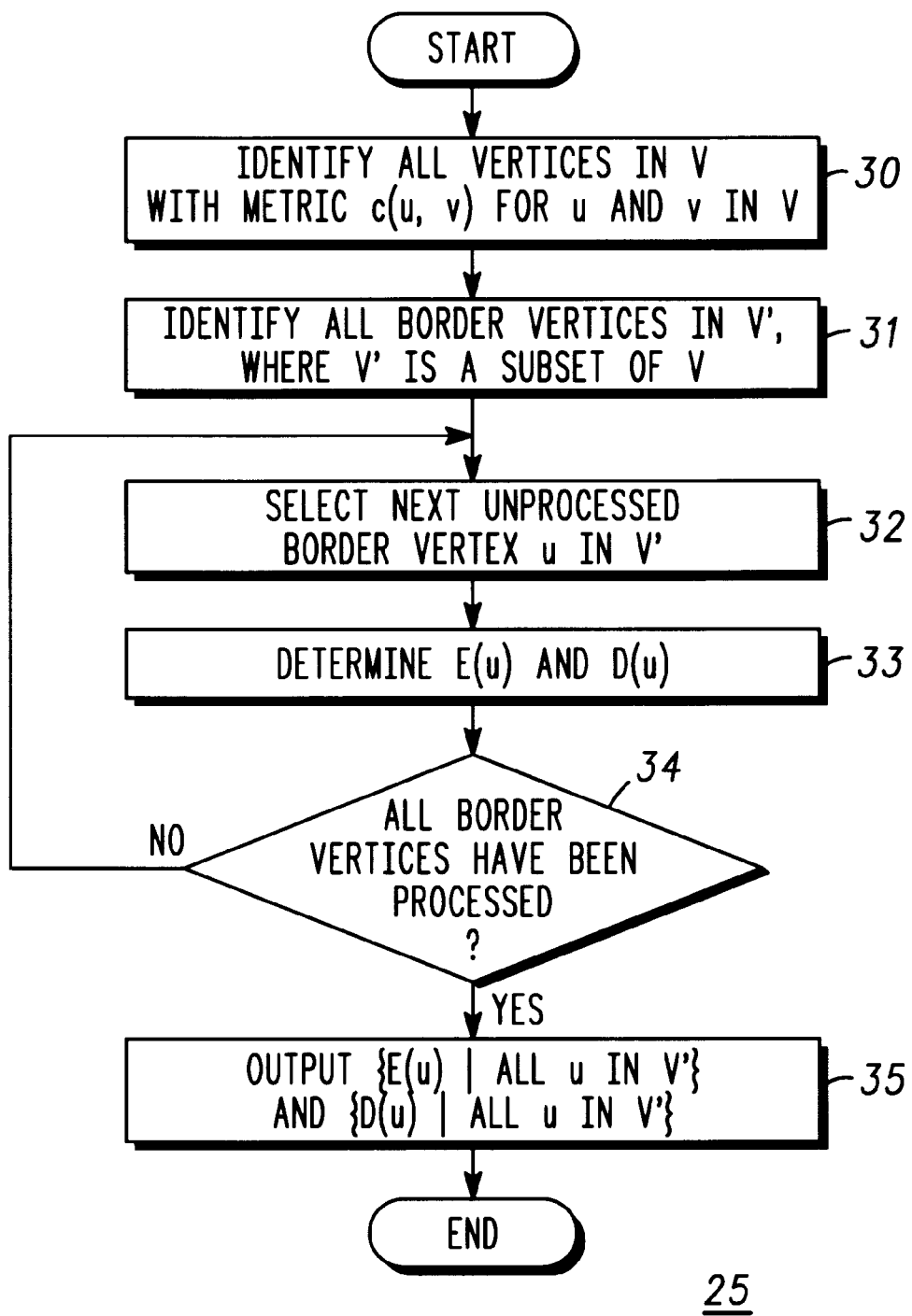
FIG. 4 outlines a method for producing the lossless, compressed aggregation of FIG. 3.
Figure 5:
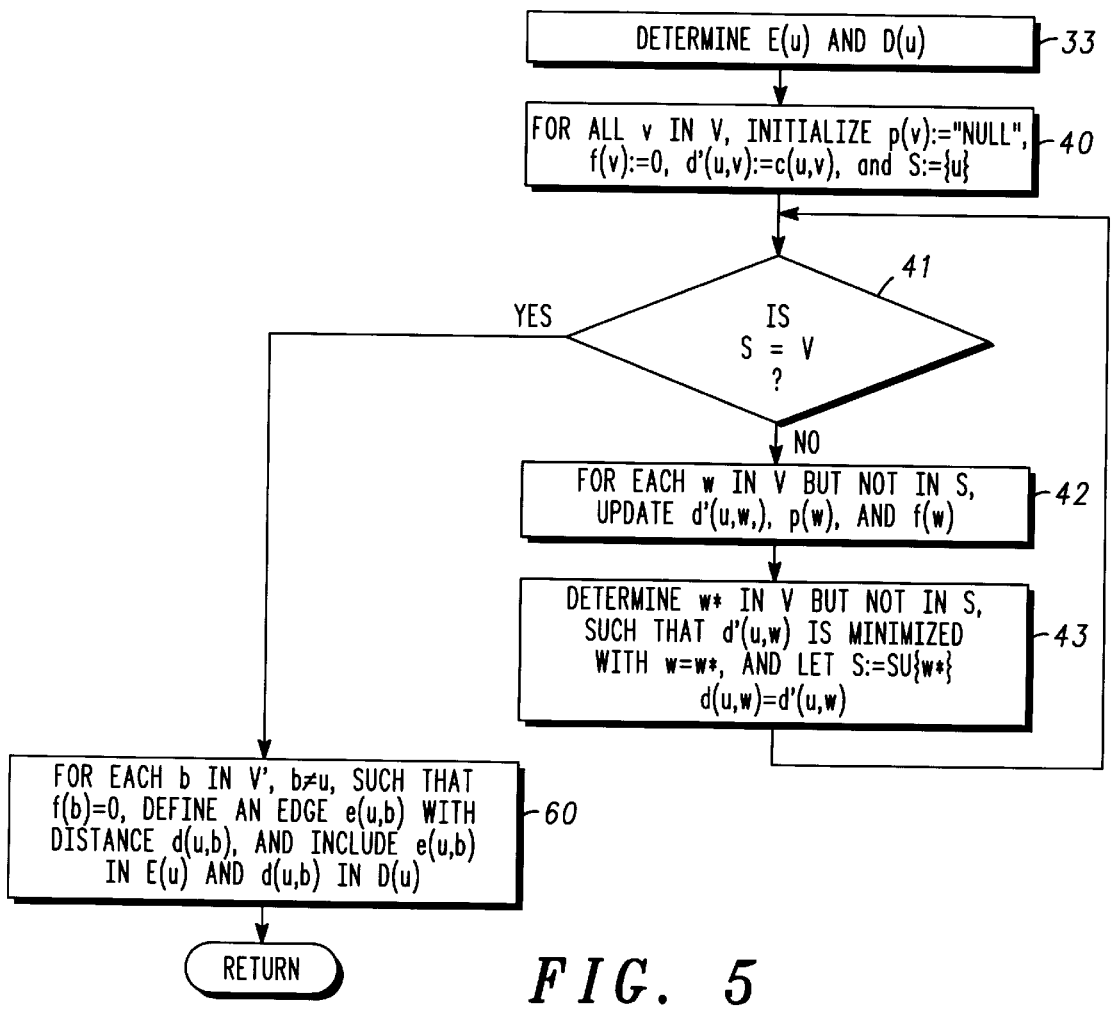
FIGS. 5, 6, and 7 depict details of the method of FIG. 4.
Figure 6:
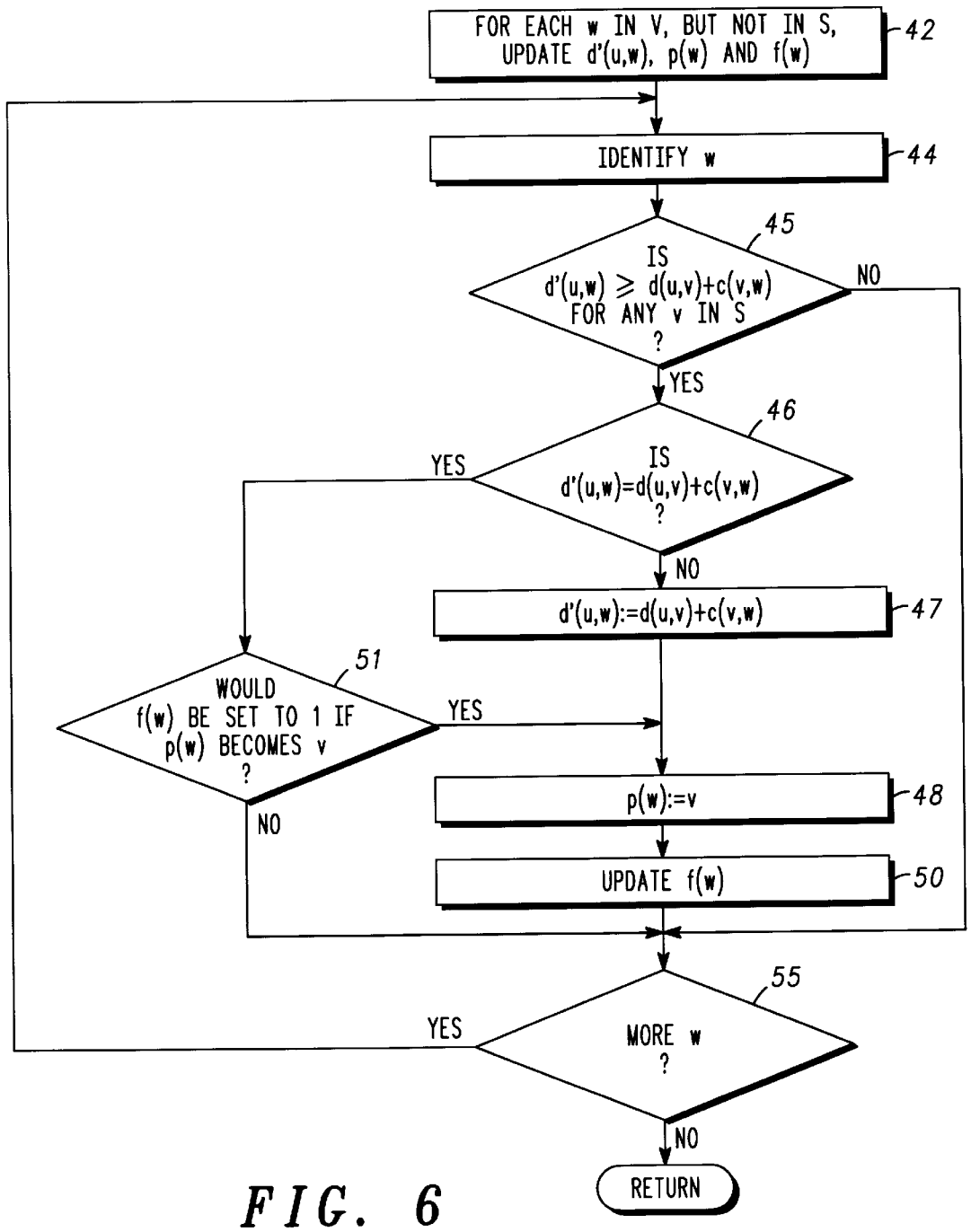
Figure 7:
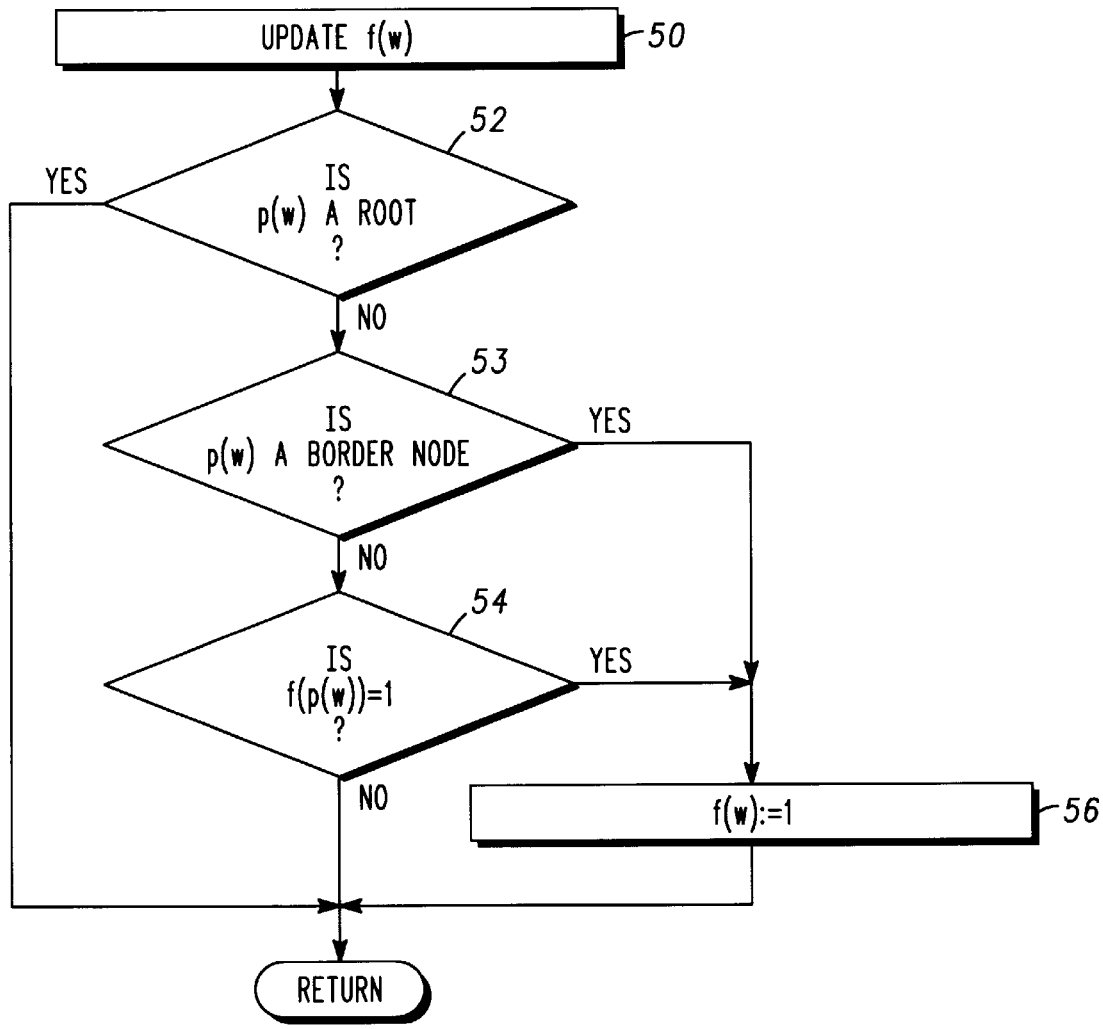

FIG. 4, and more detailed FIGS. 5 through 7, define a method 25 in accordance with the present invention. For purposes of understanding, the method will be described in terms of a graph for a particular metric. The method 25 begins in step 30 by identifying all the vertices in the peer group 21 of FIG. 1 (namely the vertices A through H) and the associated metric $c(u,v)$ corresponding to the actual edge lengths or metric values as a predetermined topology characteristic. It should be noted that vertices that are separated by one or more vertices initially have a metric value of $\infty$ (infinity), which are reduced to their actual value in the iterative process described below. The set of these selected values correspond to each edge in the graph and, for the graph in FIG. 1, are: $c(A,B)=1$, $c(A,C)=\infty$, $c(A,H)=\infty$, $c(B,A)=1$, $c(B,H)=1$. Step 31 assigns all the border vertices to a set V'. In the graph of FIG. 1, the set V' comprises vertices A, B, C and D. Vertices E through H are interior vertices.

Step 32 selects as a first vertex in a pair, a vertex "u" that is one of the unprocessed border vertices in the subset V'. The specific sequence of selection is arbitrary. For purposes of this explanation, it will be assumed that the vertex A is selected so that u=A. This is also called a "root". For any path, the second vertex in a phase is "v".

For the root u, with u=A after selecting vertex A as the root, procedure 33 then determines the identity of the edge set E(u) containing non-redundant edges connecting the root to nearest border vertex neighbors of u, and the distance set D(u) containing corresponding distances or metric values associated with the edges in E(u). Procedure 33 operates in an outer loop under the control of step 34. Step 35 produces an output that is in the form of data for storage in the network (i.e., collectively at a central site or distributed among the different border vertices, depending on the design) in which the shortest path is given for the specific metric. In terms of the previously described FIG. 3, the E(A) set for the border vertex A will contain e(A,B), and the set D(A) will contain the value of d(A,B), which is one.

FIG. 5 depicts the procedure 33 in greater detail. Step 40 initializes various items including a parent flag $p(v)$, a tentative distance $d'(u,v)$ and a set S. Specifically, $d'(u,v):=c(u,v)$, $S:=\{\}$ which is an empty set and $p(v):=$"null" where ":=" symbolizes a replacement. These are items normally initialized in accordance with the conventional Dijkstra methodology.

In addition and in accordance with this invention, a category flag $f(v)$ is set to identify a first category; specifically for each v in V, $f(v):=0$ for initialization. This flag, if subsequently set to 1, enables the elimination of redundant information from the final topology aggregation.

After initialization, step 41 tests to determine if all the vertices are included in the set S. Step 41 acts as control for an intermediate loop including a procedure 42 that defines tentatively best available alternate paths and a procedure 43 that selects an optimal path from the first category. Procedure 42 identifies for each vertex w in V, but not in S, an updated estimated value $d'(u,w)$ and corresponding values for the $p(w)$ and $f(w)$ flags. Procedure 42 begins when step 44, shown in FIG. 6, identifies a particular value of "w". Step 44 is the initial step in an inner loop that, for each root, will identify, as intermediate vertices, vertices already in the set S and the next vertex, not in the set S, to be added to the set S, as the optimal path from the root to that vertex is determined. This loop comprises steps 44 through 51, which steps are shown in FIG. 6 and described below. For purposes of this explanation, it is assumed that the possible values of w are selected in alphabetical order and that the characteristics associated with the edges are metrics, so w:=B during an initial iteration when u:=A, v:=A, $c(u,v)=c(A,A)=0$ and $d'(u,v)=d'(A,A)=0$.

Referring now to FIG. 6, step 45 compares the lengths from the root to the vertex w under consideration as a direct path through the intermediate vertex v, wherein the optimal path from the root to vertex v is known or has already been determined in a previous iteration. In the initial pass through this procedure d'(u,w)=d'(A,B)=1; d(u,v)=d(A,A)=0; c(v,w)=c(A,B)=1. The expression in step 45 is satisfied because the value d'(A,B) equals the sum d(A,A)+c(A,B). Consequently step 45 diverts to step 46. If an equality did not exist, step 47 would update the value of d'(u,w) by replacing the value with the second value or sum as a new estimated value because the sum, by its value, indicates that the path through the intermediate vertex is preferred. Then the method, in step 48, would replace the parent flag of the end vertex w with the intermediate vertex v, i.e., p(w)=p(B):=A. Step 50 would update the category flag value f(w) in procedure 50. In this particular iteration, however, an equality does exist so step 45 diverts to step 51 that determines whether the category flag f(w) would be set to a logic "1" if the parent of w were to become the vertex v.

Step 51 requires the system to perform tests that are equivalent to the test of procedure 50. Consequently reference is now made to FIG. 7. Generally speaking, if the parent of a vertex being analyzed is a root, no change is made to the initial value of the f(w) category flag. If the parent is not a root, step 53 then determines whether the parent is a border vertex. If it is not, step 54 determines whether the flag for the parent vertex is set to a 1, i.e., whether f(p(w))=1. If not, step 54 completes the operation and the system returns control to step 55 in FIG. 6 without changing the category flag. If, however, the parent is not a root but is a border vertex, control passes from step 52 through step 53 to step 56 to set the f(w) category flag to 1. If the parent is not a root, but is an interior vertex and the parent category flag is set, control also transfers from step 54 to step 56 to set the f(w) category flag to 1. According to the invention, setting the category flag to 1 essentially assigns the path from the root to the vertex under consideration to the second category.

Referring back to the example of FIG. 1 and the processing of step 51, in this particular iteration w:=B and p(w)=p(B):=A that is a root. So step 52 in FIG. 7 determines that the flag would not be set to 1. In this case, step 51 in FIG. 6 diverts to step 55. Thus at the completion of the iteration in FIG. 6, w=B, d'(A,B)=1, p(B)=A and f(B)=0.

As additional vertices are still unanalyzed after this iteration, step 55, the inner loop control, diverts back to step 44 to identify a next vertex, i.e., w:=C, assuming the vertices are analyzed alphabetically. At step 45 in this second iteration, the vertex A is still the only vertex allowed to be an intermediate vertex, and hence v=A. Also d'(u,w)=d'(A,C)=∞ and c(v,w)=c(A,C)=)=∞. When the iteration of FIG. 6 is complete, w=C, d'(A,C)=)=∞, p(C)="null" and f(C)=0. When step 55 exits after processing all the vertices, w, the following relationships will exist for the root vertex A:

| Vertex (w) | d' (u,w) | p (w) | f (w) | w in Set S? |
|---|---|---|---|---|
| B | 1 | A | 0 | Yes |
| C | ∞ | "null" | 0 | No |
| D | ∞ | "null" | 0 | No |
| E | 2 | A | 0 | No |
| F | 2 | A | 0 | No |
| G | ∞ | "null" | 0 | No |
| H | ∞ | "null" | 0 | No |

On return from FIG. 6 through the inner loop control step 55, step 43 in FIG. 5 determines a value w* in V, but not in S, such that d'(u,w) is a minimum value. In the foregoing table, it will be apparent that w*=B provides the minimum. Consequently d(A,B) becomes a finally labeled value of the vertex pair and is set to d'(u,w*) so that d(A,B)=1. Moreover, the vertex B moves into the set S with the vertex A. Control transfers to the intermediate loop control step 41 to determine if another vertex needs to be analyzed for the set.

Figure 8:
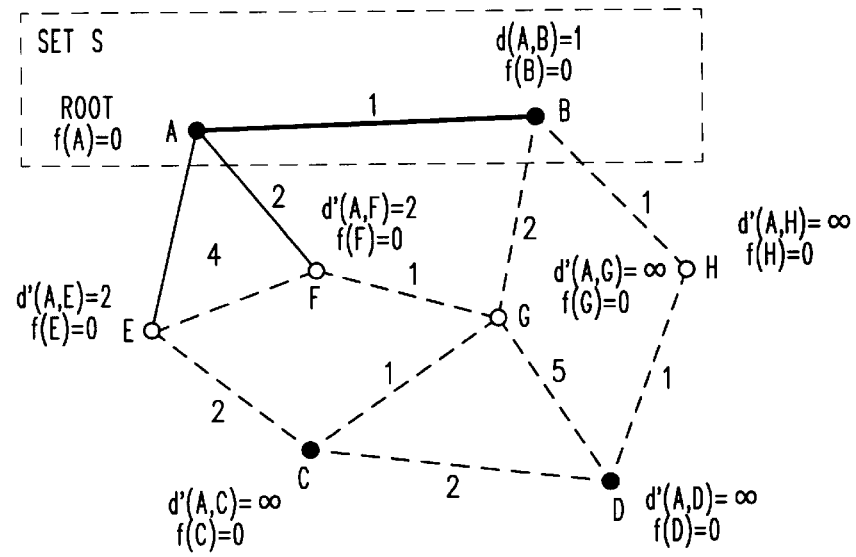
FIGS. 8 through 15 are useful in understanding the method depicted in FIGS. 4 through 7 as applied to the graph of FIG. 1.

FIG. 8 graphically depicts the results of this first analysis. As illustrated, the root A and the border vertex B are both located in set S. All the category flags f(A) through f(H) have a zero value; (i.e., f(A)=f(B)= . . . f(H)=0 and d(A,B)=1) as a first distance. All other distances remain their respective estimated values. In addition, the E and F vertices are also indicated as direct neighbors of vertex A, because d'(A,E) and d'(A,F) have finite values.

After this step, only the vertices A and B are in set S. Consequently the intermediate loop control step 41 in FIG. 5 transfers the method back to the procedure 42 to begin a second set of inner loop iterations. Now vertices in V, but not in S, include vertices C through H. The tentative distances between the vertex A and each of the remaining vertices C through H has been obtained. The system next obtains the values of the distances from vertex A directly or through the vertex B to each of the vertices C through H. With respect to edges between vertex A and the vertices C through H, only edges A–E and A–F have values subject to a minimum analysis. With respect to paths directly from vertex A, d'(A,E)=2 and d'(A,F)=2. With respect to paths through vertex B, d'(B,C)=d'(B,E)=d'(B,F)=∞. However, the distances through the vertex B to the vertices G and H are 2 and 1 respectively, (i.e., d'(B,G)=2 and d'(B,H)=1.

When the system analyzes the graph of FIG. 1 during this iteration, u:=A, v:=B and w:=G. Consequently d'0(u,w)=d' (A,G,)=∞, d'(u,v)=d'(A,B)=1 and c(v,w)=c(B,G)=2. Step 45 in FIG. 6 then diverts to step 46. As an inequality exists, step 47 replaces the tentative distance d'(A,G) with the sum, so d'(A,G):=3. Step 48 sets the parent flag to v (i.e., p(w)=p (G):=B). Then procedure 50 updates the flag f(G). In this case the parent vertex B is a border vertex, so step 53 in FIG. 7 diverts to step 56 and sets the flag (i.e., f(G):=1). A similar analysis of w:=H establishes d'(A,H)=2, p(H)=B and f(H)=1. Thus, when the second set of inner loop iterations has been completed, the following values exist:

| w | d' (u,w) | p (w) | f (w) | w in Set S? |
|---|---|---|---|---|
| B | 1 | A | 0 | Yes |
| C | ∞ | "null" | 0 | No |
| D | ∞ | "null" | 0 | No |
| E | 2 | A | 0 | Yes |
| F | 2 | A | 0 | No |
| G | 3 | B | 1 | No |
| H | 2 | B | 1 | No |

After this iteration and, in the context of FIG. 1, there are now three minimum paths each with d'(u,w)=2 wherein w is E, F and H. The particular selection again of one of these minima is arbitrary. Again, assuming a selection in alphabetical order, the minimum associated with vertex E is selected in step 43 of FIG. 6, so w*=E. Consequently, d(A,E) becomes a finally labeled value of the vertex pair and is set to d'(u,w*) so that d(A,E)=2.

Figure 9:
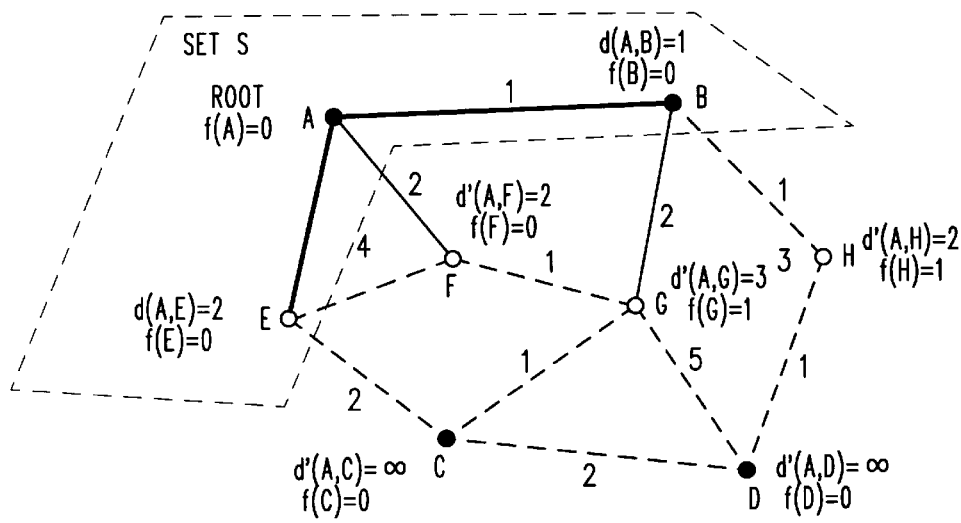

FIG. 9 represents the state of the analysis with vertices, A, B and E in set S. All the category flags remain at 0, except for f(G) and f(H) category flags. At this stage vertices C, D, F, G and H remain available for substitution for w. There are new values for certain edges, namely: d'(A,G)=3 and d'(A, H)=2. In a third iteration of the inner loop, the procedure 42 identifies a new vertex w, during an initial portion of this set of iterations u:=A, and the system obtains the values of the distances from vertex A directly or through the vertex B or vertex E to each of the vertices C, D, F, G and H. When this analysis has been completed, the following values exist:

| w | d' (u,w) | p (w) | f (w) | w in Set S? |
|---|---|---|---|---|
| B | 1 | A | 0 | Yes |
| C | 4 | E | 0 | No |
| D | ∞ | "null" | 0 | No |
| E | 2 | A | 0 | Yes |
| F | 2 | A | 0 | Yes |
| G | 3 | B | 1 | No |
| H | 2 | B | 1 | No |

With particular reference to the iterations when w:=F, w:=G and w:=H, d'(u,w) will be greater than d(u,v)+c(v,w). Thus, step 44 will transfer control directly to step 55 in FIG. 6. Consequently the original values of d'(u,w) and the category flags remain unchanged. When the third iteration ends, the values d'(A,F)=2 and d'(A,H)=2 will be the minimum.

Figure 10:
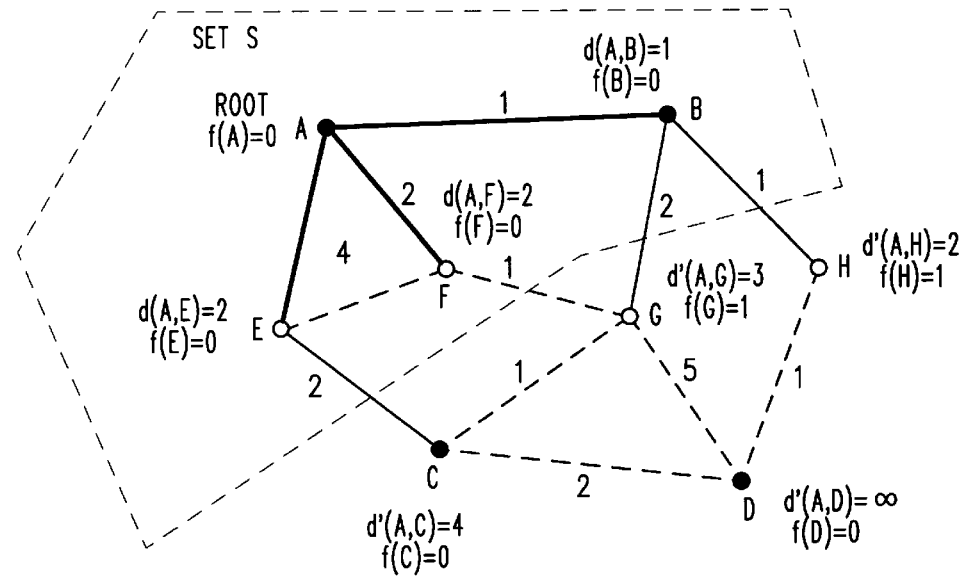
Figure 11:
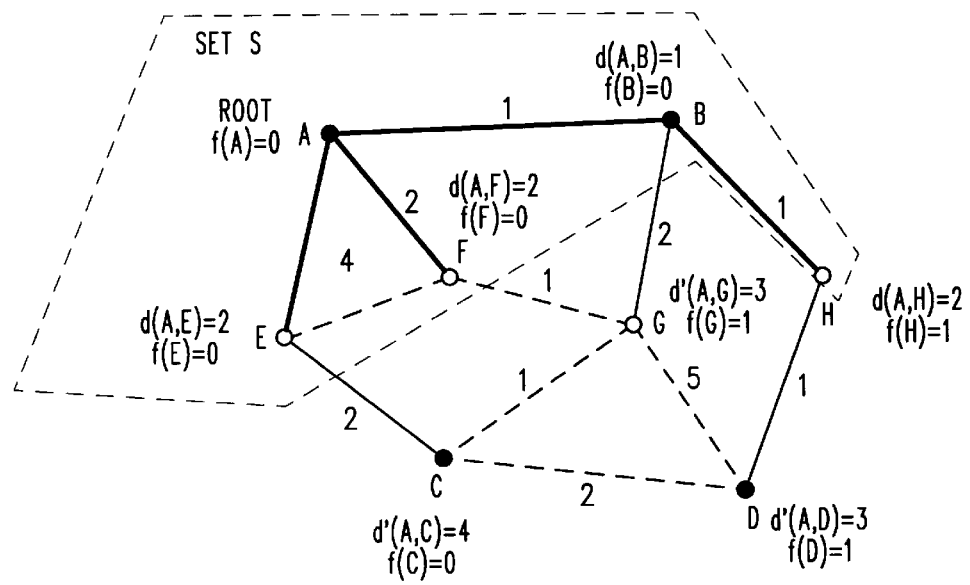

FIG. 10 illustrates the set S after Vertex F is added and the distance is labeled d(A,F)=2. The category flag f(F) remains at 0. At the beginning of the fourth iteration, possible values of "w" are C, D, G and H. When u:=A, v:=B and w:=G, the edge d'(A,G)=3. No changes occur because step 51 would set f(G) to 1, but f(G)=1 at the end of the third iteration. If v:=F and w:=G, there is a similar result. However, when the vertex F is tested, the procedure of FIG. 7 determines the f(G) would not be set because the parent is not a root, not a border vertex and its category flag is not set to 1. Thus at the end of the fourth iteration, and as shown in FIG. 11, the minimum distance is d'(A,H), so vertex H is included in set S with d(A,H)=2 and the tentative distance between vertices A and D is d'(A,D)=3. Moreover, the parent flag is p(D)=H. Vertex H is neither a root nor a border vertex. However f(H)=1, so f(D)=1 indicating that the path traverses a border vertex B. The path from vertex B to vertex D will be redundant to the path that will be obtained when the border vertex B becomes a root. When the analysis for this iteration has been completed, the following values exist:

| w | d' (u,w) | p (w) | f (w) | w in Set S? |
|---|---|---|---|---|
| B | 1 | A | 0 | Yes |
| C | 4 | E | 0 | No |
| D | 3 | H | 1 | No |
| E | 2 | A | 0 | Yes |
| F | 2 | A | 0 | Yes |
| G | 3 | B | 1 | No |
| H | 2 | B | 1 | Yes |

When the analysis for the final iteration has been completed, the following values exist:

| w | d' (u,w) | p (w) | f (w) | w in Set S? |
|---|---|---|---|---|
| B | 1 | A | 0 | Yes |
| C | 4 | E | 1 | No |
| D | 3 | H | 1 | Yes |
| E | 2 | A | 0 | Yes |
| F | 2 | A | 0 | Yes |
| G | 3 | B | 1 | No |
| H | 2 | B | 1 | Yes |

Figure 12:
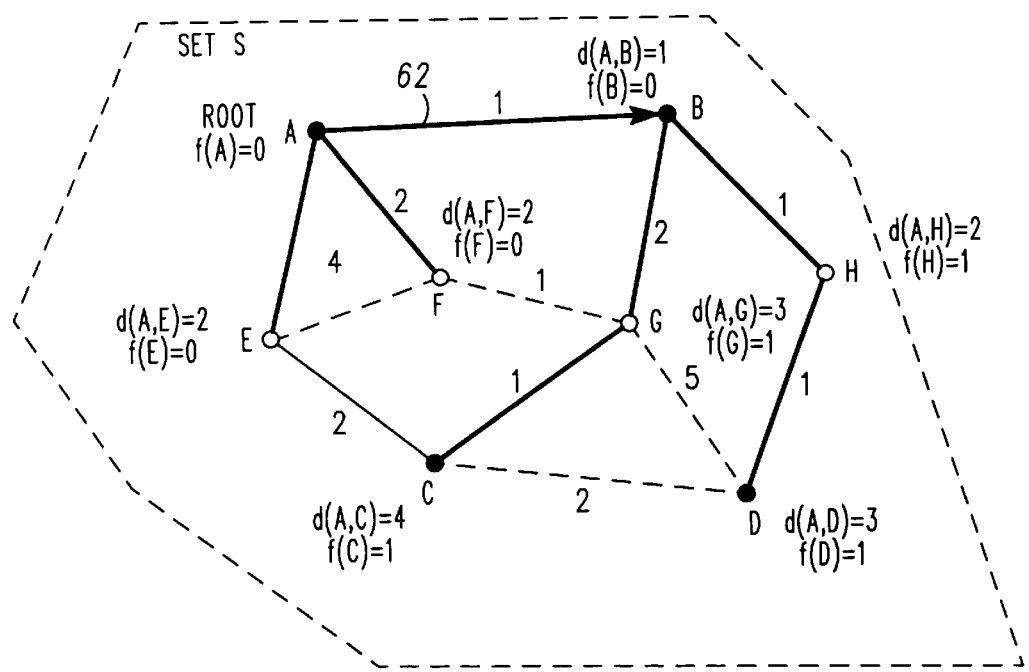

Thus at the completion of the various inner loop iterations involving the root A, the information obtained defines a complete shortest path tree based upon the vertex A, as shown in FIG. 12. When this occurs, step 41 in FIG. 5 diverts to step 60 that then identifies any edges that ought to be placed in the final lossless compressed graph. For each border vertex b, that is not the root u and has a corresponding category flag set to 0, the system defines an edge e(u,b) with a distance d(u,b). Looking at FIG. 12, only one path satisfies that criterion that establishes a non-redundant optimal path. Thus the edge e(A,B) with distance d(A,B)=1 is defined, and step 60 includes e(A,B) and d(A,B) in the E(u) and D(u) sets, respectively. Consequently the edge from vertex A to vertex B becomes an optimal path 62 that is non-redundant. Then control passes back to outer loop control step 34 in FIG. 4 to determine whether all the border vertices have been analyzed.

Figure 13:
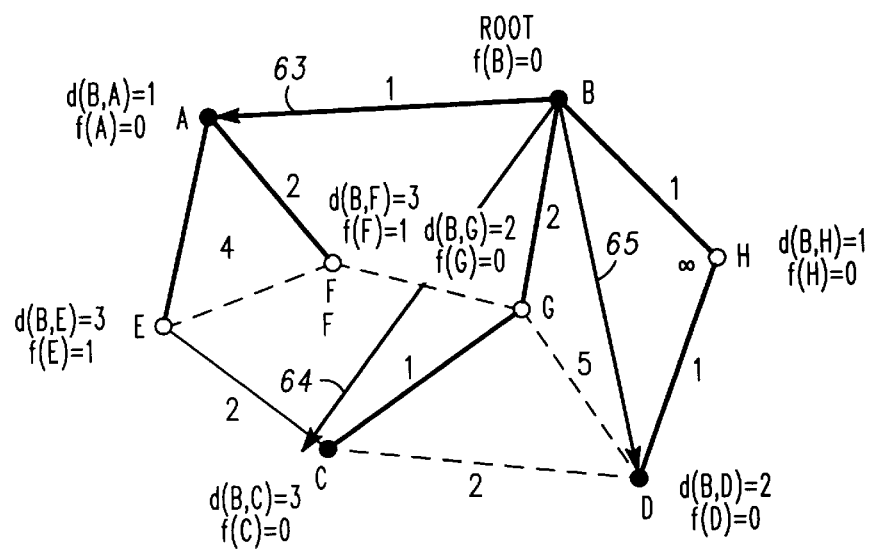

When the system repeats the foregoing analysis using the border vertex B as a root, the shortest paths to the border vertices A, C and D are as shown in FIG. 13. The saved entries for u=B will be e(B,A) with d(B,A)=1, e(B,C) with d(B,C)=3 and e(B,D) with d(B,D)=2. These represent optimal paths 63, 64 and 65, respectively.

Figure 14:
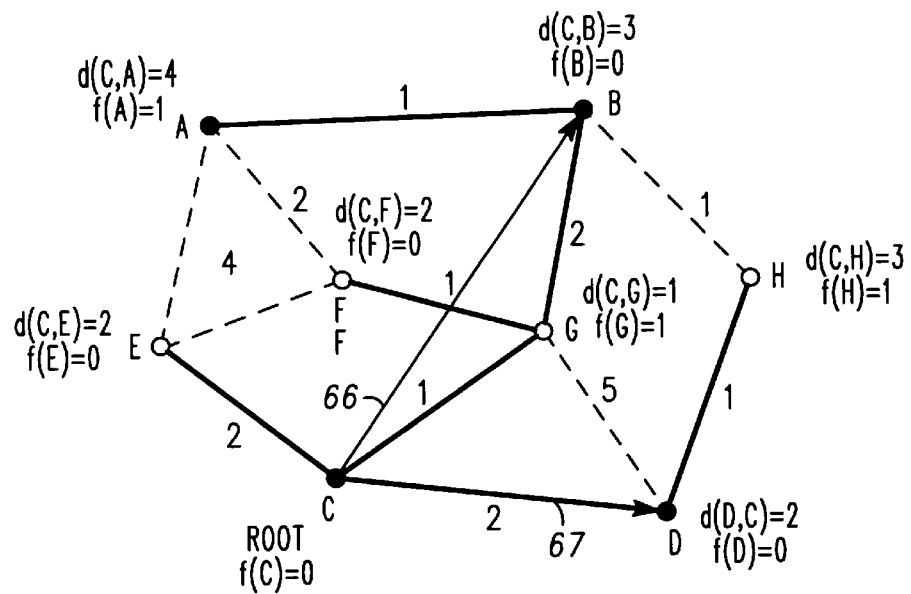
Figure 15:
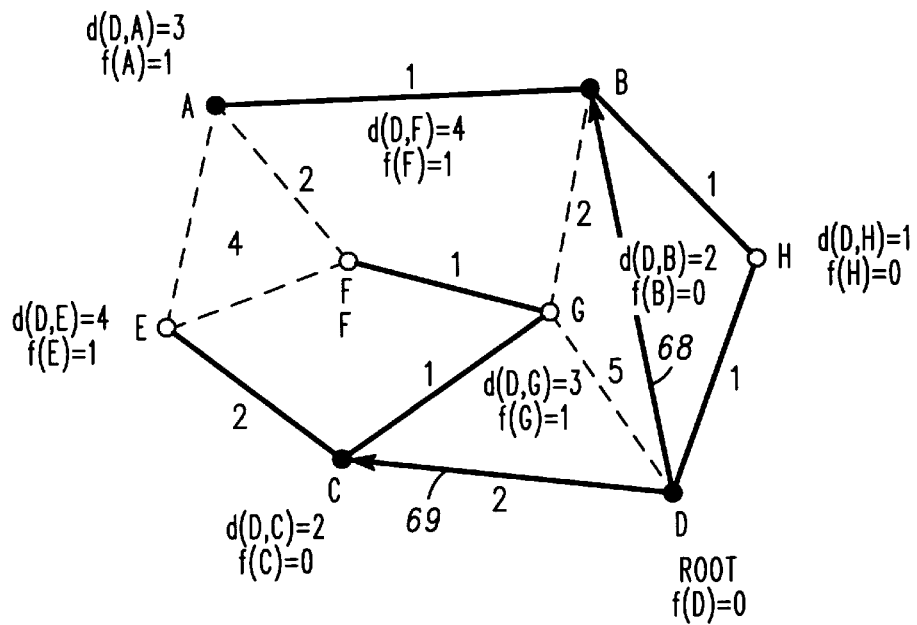

FIGS. 14 and 15 represent the results of repeating this outer loop when vertices C and D are designated roots, respectively. Step 60 in FIG. 5 saves, as optimal paths 66 and 67, respectively, the paths e(C,B) with d(C,B)=3 and e(C,D) with d(C,D)=2, as shown in FIG. 14. Similarly, optimal paths 68 and 69 are saved in e(D,B) with d(D,B)=2 and e(D,C) with d(D,C)=2, as shown in FIG. 15.

Each separate analysis in accordance with FIGS. 12 through 15 contributes one or more different edges or non-redundant optimal paths to a final graph. That graph is the graph of FIG. 3 and is the lossless compressed topology aggregation for the communication network 20 in FIG. 1. That is, FIG. 3 constitutes a union of the optimal paths from each of FIGS. 12 through 15.

In this example, it is assumed that the edges in the communication network have symmetric topology characteristics. That is, it is assumed that the topology characteristic from one vertex, such as vertex A, to another vertex, such as vertex B, has the same value as the topology characteristic for the reverse path, the path from vertex B to vertex A. If the edges in a communication network are allowed to have asymmetric topology characteristics, separate optimal paths would be determined and included in the final lossless compressed topology aggregation. Thus, the modification to the basic Dijkstra procedure described above segregates each edge into one of first and second categories based upon the setting of the f(w) category flag. The first category includes those paths from a root to other border vertices that do not cross another border vertex signified in the particular embodiment with f(w)=0. All remaining paths fall into the second category. Placing each edge in a category greatly simplifies the process of obtaining the union of the optimal paths in the first category to provide a perfect graph compression representation of a network, in accordance with the invention.

A conventional Dijkstra procedure, as known, has a computational complexity in the order of $N^2$ per shortest path tree rooted at a border vertex; where N represents the total number of vertices in the peer group including border and interior vertices. If M represents the total number of border vertices, the order of magnitude of computational complexity for this embodiment of the invention is $MN^2$ that can be significantly less than the order $N^3$ when the number of border vertices, M, is significantly smaller than the total number of vertices.

As will be apparent, the information generated during the performance of the method of this invention produces results that constitute a significant reduction of data required in the topology representation compared to that of a representation in the form of a full mesh graph. This minimization of topology data without loss of any topology information is particularly desirable when there are many border vertices, as the amount of uncompressed topology data is in the order of the square of the number of border vertices (i.e., $M^2$). Such minimization is particularly advantageous for conservation of transmission and storage resources in a hierarchical ATM network, where the topology data associated with a peer group must be distributed to and stored at border vertices in all other peer groups.

Further, the totality of the information in E(u) includes information about reverse paths, such as the path A-B and the path B-A. For symmetrical networks, also known as undirected graphs, this redundant information is merely combined. If the graph is directed, as for example if d(A, B)≠d(B,A), the advertised information will still be accurate.

Modified Floyd-Warshall Procedure

The Floyd-Warshall methodology, modified in accordance with this invention, also produces a lossless compressed topology aggregation. The Floyd-Warshall procedure determines optimal paths between all pairs of vertices together. Whereas the Dijkstra methodology iterates on the length of the path, the Floyd-Warshall methodology iterates on the set of vertices that are allowed as intermediate vertices on the paths. After starting with single edge distances without intermediate vertices as starting estimates of the shortest path lengths, the Floyd-Warshall methodology determines shortest paths under the constraint that only one selected vertex can be used as an intermediate node and then with the constraint that only selected vertices can be used, and so forth.

In accordance with this invention, the modification divides the procedure into two phases. During a first phase, iterative processing for determining optimal paths is limited to interior vertices only. In the second phase, iterative processing involves the border vertices and segregates optimal paths between the border vertices into first and second categories. The path information that exists after these two phases concerning the edges between border vertices in the first category contains the information for a lossless compressed topology aggregation.

Figure 16:
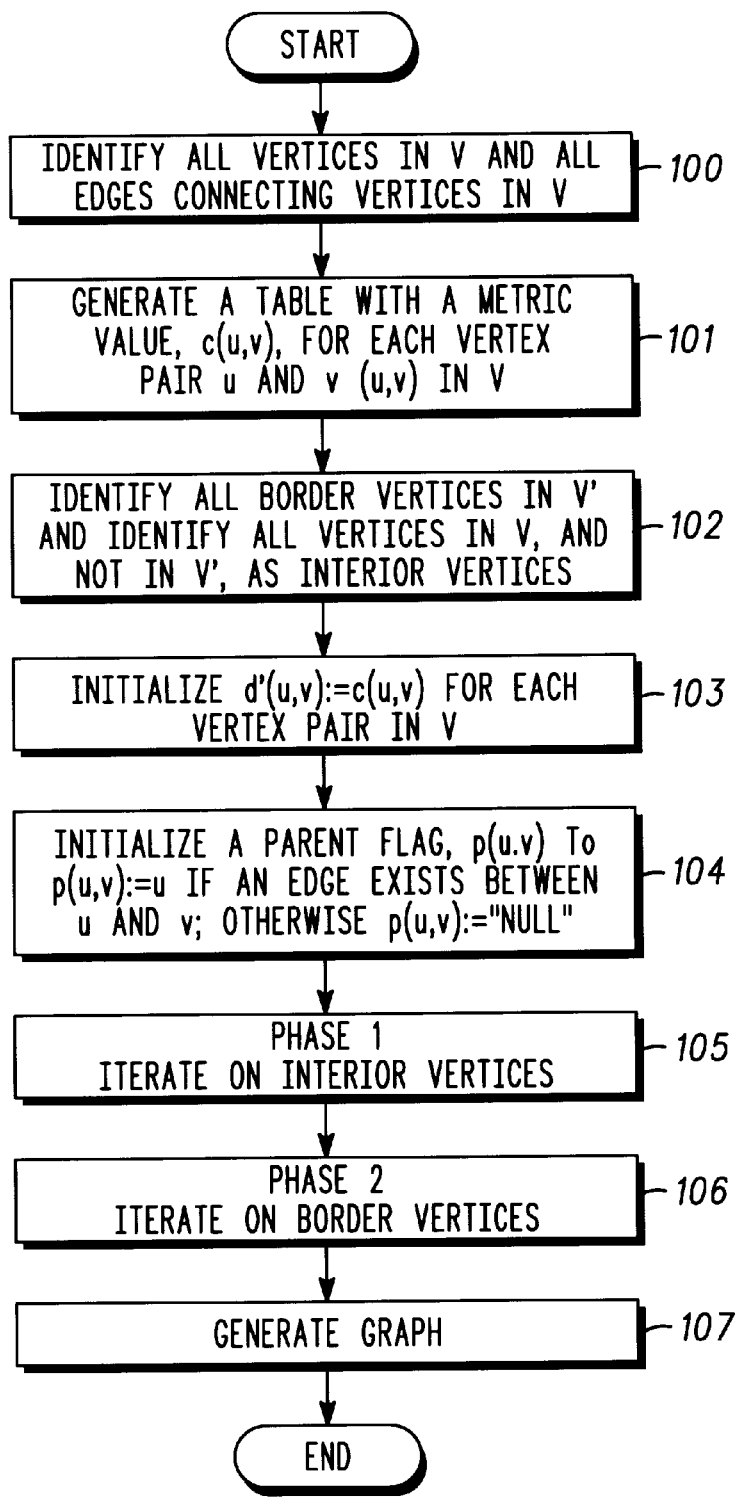
FIG. 16 depicts, in general terms, an alternative method in accordance with this invention.

Referring to FIG. 16, in step 100 the methodology according to this invention identifies all the vertices in V and all the edges connecting the vertices in V. Step 101 then generates a table with a metric value for each vertex pair. Thus this table is like the table produced in the modified Dijkstra methodology described above. In the context of the peer group 21 shown in FIG. 1, the values are c(A,B)=1, c(A, C)=∞,. c(H,F)=∞, c(H,G)=∞. Step 102 identifies all the remaining vertices as interior vertices. In FIG. 1, vertices A, B, C and D are border vertices, while vertices E, F, G and H are interior vertices. Step 103 utilizes the table established in step 101 to produce an estimated distance for each pair of vertices in the peer group 21. Thus d'(A,B)=1, d'(A,C)=∞, . d'(H,F)=∞, d'(H,G)=∞. At the same time, a parent flag is initialized (104) for each vertex pair. If an edge exists connecting u to v, then p(u,v):=u; otherwise p(u,v):="null". Thus, in FIG. 1, p(A,B)=A, p(A,C)="null", p(H,F)="null" and p(H,G)="null". During this initialization it is also possible to initialize a category flag f(u,v) to an initial value.

After initialization, a first phase procedure 105 (detailed in FIG. 17) iterates on interior vertices; then a second phase procedure 106 (detailed in FIG. 18) iterates on border vertices before utilizing another procedure 107 (detailed in FIG. 19) to generate the lossless compressed topology aggregation. The manipulation of the category flags, f(u,v), occurs in procedure 106; and those flags are initialized during procedure 106 in this particular embodiment. These category flags are initialized to a reference or "zero" value (as later described with reference to FIG. 18). FIG. 20 graphically depicts the values for d'(u,v) and p(u,v) after the initialization is completed in step 104. As the various entries in FIG. 20 can be obtained by inspection, no further discussion of those values should be required.

Figure 17:
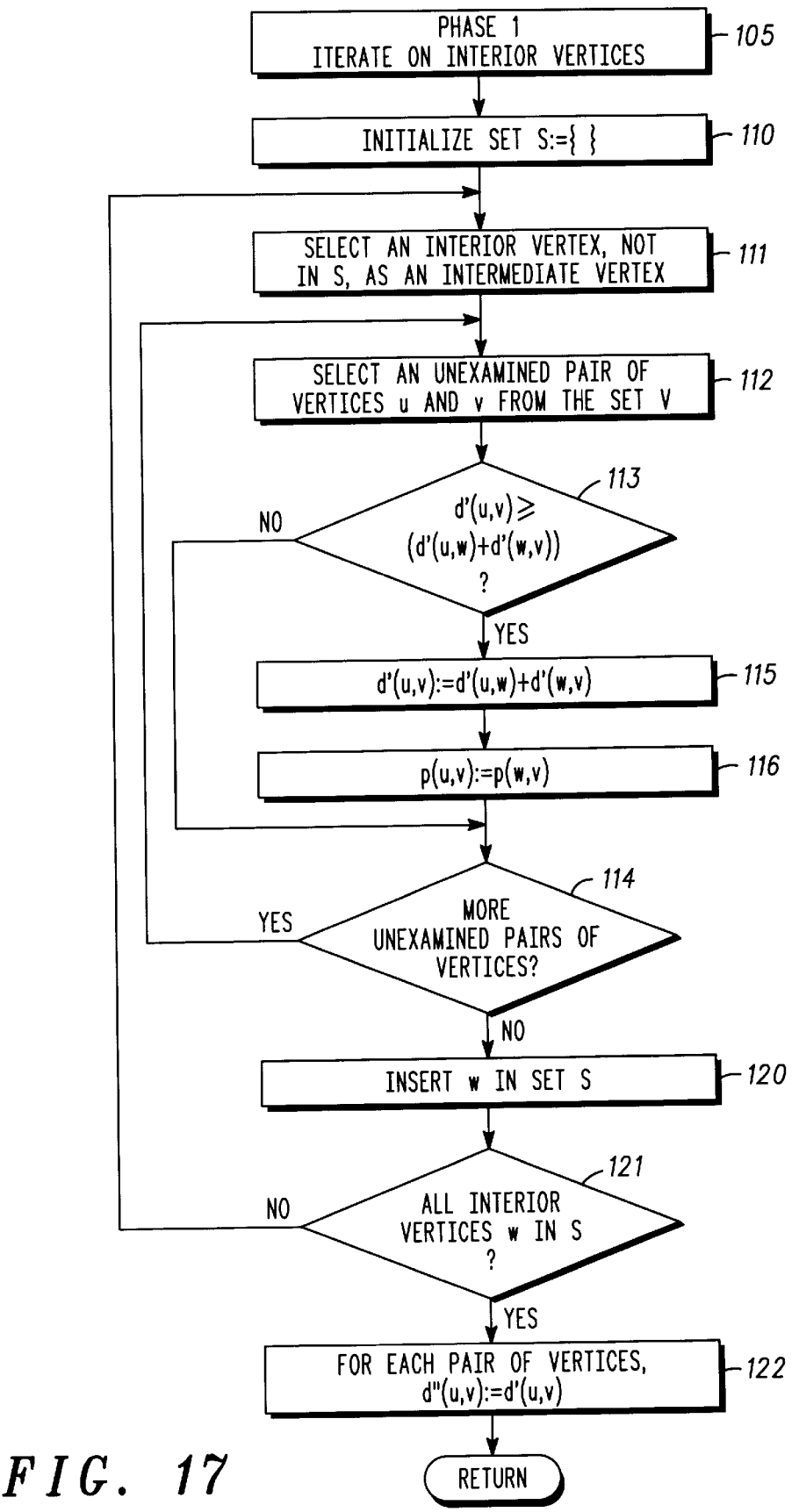

Referring to FIG. 17 a first step 110 in the first phase procedure 105 initializes a set (S) to indicate there are no members of the set. Step 111 selects an interior vertex, not in S, as an intermediate vertex. Assuming the interior vertices are analyzed in alphabetical order, in a first iteration, step 111 selects interior vertex E (i.e., w:=E). Then the system enters a loop during which each vertex pair in the set V is examined to determine, for additive metrics, the shortest path between those pairs. Step 112 selects a first pair, whereby (again assuming an alphabetic order) u:=A and v:=B, the pair (A,B) would be obtained. Step 113 then determines the existing estimated length of that path versus the length of the path through the intermediate vertex. In this particular case the estimated distance d'(u,v)=d'(A,B)=1. By inspection from FIG. 1, d'(u,w)=d'(A,E)=2 and d'(w,v)=d' (E,B)=∞.

In this case, the original estimated distance from vertex A directly to vertex B is less than the distance from vertex A to vertex B through the intermediate vertex E, so step 113 branches to step 114 that acts as an inner loop control. As more vertices exist, step 114 branches back to step 112, which then assigns C to v. Now, d'(u,v)=d'(A,C)=∞, d'(u, w)=d'(A,E)=2 and d'(w,v)=d'(E,C)=2. The length through the intermediate interior vertex E is less than the direct path, so step 113 diverts to step 115 that replaces the estimated distance between the vertices A and C, d'(A,C) with the path length through the intermediate vertex E (i.e., 4). Step 116 replaces the parent flag, i.e., p(u,v)=p(A,C):=p(E,C)=E. Thereafter step 116 transfers to step 114 to determine if there are any more unexamined pairs of vertices. If another pair exists, step 114 branches back to step 112.

When the iterations involving all pairs of vertices and the vertex E as an intermediate vertex are complete, loop control step 114 diverts operations to step 120 that inserts the interior vertex E into the set S. Step 121, that is an outer loop control, determines whether all the interior vertices are in the set S. In the context of FIG. 1, step 121 returns operations to step 111 until all the interior vertices E through H have been assigned to the set S. After the interior vertex E is included in the set, vertex F would be selected next, in accordance with an alphabetical order, by step 111 in the operation of the outer loop.

When all the interior vertices have been processed, step 121 diverts to step 122 that provides an optional step of duplicating the values of d'(u,v) resulting from the procedure of FIG. 17 as values d"(u,v), for use as later described. These states are cumulatively stored at the appropriate nodes. That is, FIG. 21 depicts the state of the estimated lengths d'(u,v) and the parent flags p(u,v) for each ordered pair of vertices after completing phase one, i.e., the iteration on interior vertices in procedure 105 in FIG. 17. Blocks marked with an asterisk (i.e., "*") indicate changes made during the first phase. The operations producing those changes are apparent from the foregoing discussion.

Figure 18:
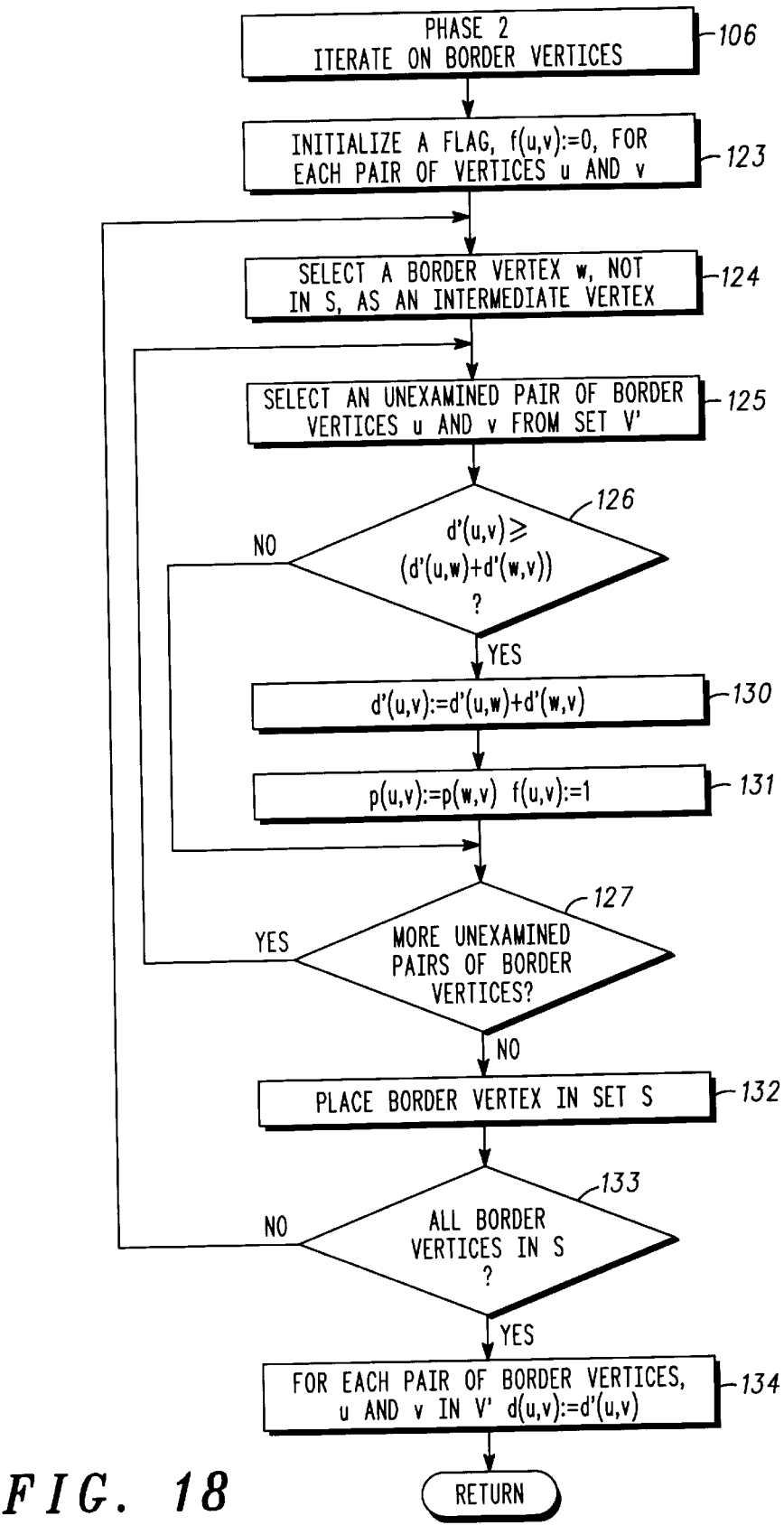

Now referring to FIG. 18 in which the procedure 106 iterates on border vertices, in a first step 123 all the category flags f(u,v) are initialized to a zero value that corresponds to a first category. It should be noted that this step, according to one embodiment, could occur earlier, e.g., as an added portion of step 104 in FIG. 16. At this stage, the set S includes the interior vertices E, F, G and H. Step 124 selects a border vertex, w, not in S, as an intermediate vertex. Again assuming an alphabetic order, it is assumed that w=A. Step 125 then selects an unexamined pair of border vertices, u,v, from the set V'. With w=A, consider u=B and v=C. There is already a known path determined in Phase 1, namely the path through vertex G that traverses no intermediate border vertex. From FIG. 21, it can be seen that d'(u,v)=d'(B,C)=3. As border vertex A is now permitted to be an intermediate vertex, a path through vertex A is to be compared to the path through vertex G. Thus d'(u,w)=d(B,A)=1; and d'(w,v)=d'(A,C)=4. Step 126 transfers control to step 127 because the existing path d'(B,C) from FIG. 21 is less than the path through the intermediate vertex A. If step 127 determines that additional pairs of border vertices need to be tested, control transfers back to step 125.

When step 125 selects paths from vertex C, (i.e., u:=C) an analysis of the iteration utilizing the vertex A as an intermediate vertex will show that no changes will occur in any of the distances or flags during this process.

When the border vertex B is selected as an intermediate vertex in step 124 and the border vertices A and C are selected in step 125, d'(A,C)=4, d'(A,B)=1 and d'(B,C)=3. Consequently the test of step 126 determines an equality exists and transfers control to step 130 that replaces the estimated distance with the distance being tested. In this particular situation, no actual distance change occurs because they are equal. However, step 131 changes the parent flag p(u,v) from vertex E to vertex G and sets the category flag f(A,C) to one that defines the second category. Significantly, this indicates that the shortest path traverses a border vertex and is redundant.

When the step 125 selects the path from vertex A to vertex D, d'(A,D)=8, p(A,D)=G, d'(A,B)=1 and d'(B,D)=2 from FIG. 21. Consequently step 126 in FIG. 18 again transfers control to step 130 that replaces the value d'(u,v) with the new sum so that d'(A,D)=3 and step 131 replaces the parent flag so p(A,D)=G and sets the flag f(A,D)=1 to indicate that the shortest path traverses a border vertex.

Step 131 again transfers to step 127 as an inner loop controller. When all the pairs of border vertices have been determined for the initially selected intermediate border vertex A, step 127 diverts to step 132, which places the border vertex A in the set S. Step 133 acts as an outer loop control to determine whether all the border vertices have been included in the set S. In the context of this specific example, border vertices B, C and D remain outside the set so step 133 transfers control back to step 124 to select the border vertex B.

When all the border vertices have been included in set S, step 133 diverts to step 134, wherein each of the values d(u,v) receives a corresponding value d'(u,v). The resulting values are shown in FIG. 22. Each box with an asterisk (i.e., *) represents a vertex pair that has been changed with respect to the values in FIG. 21, either in terms of the length of the path or, the designation of the parent node, or the state of the category f(u,v) flag.

Figure 19:
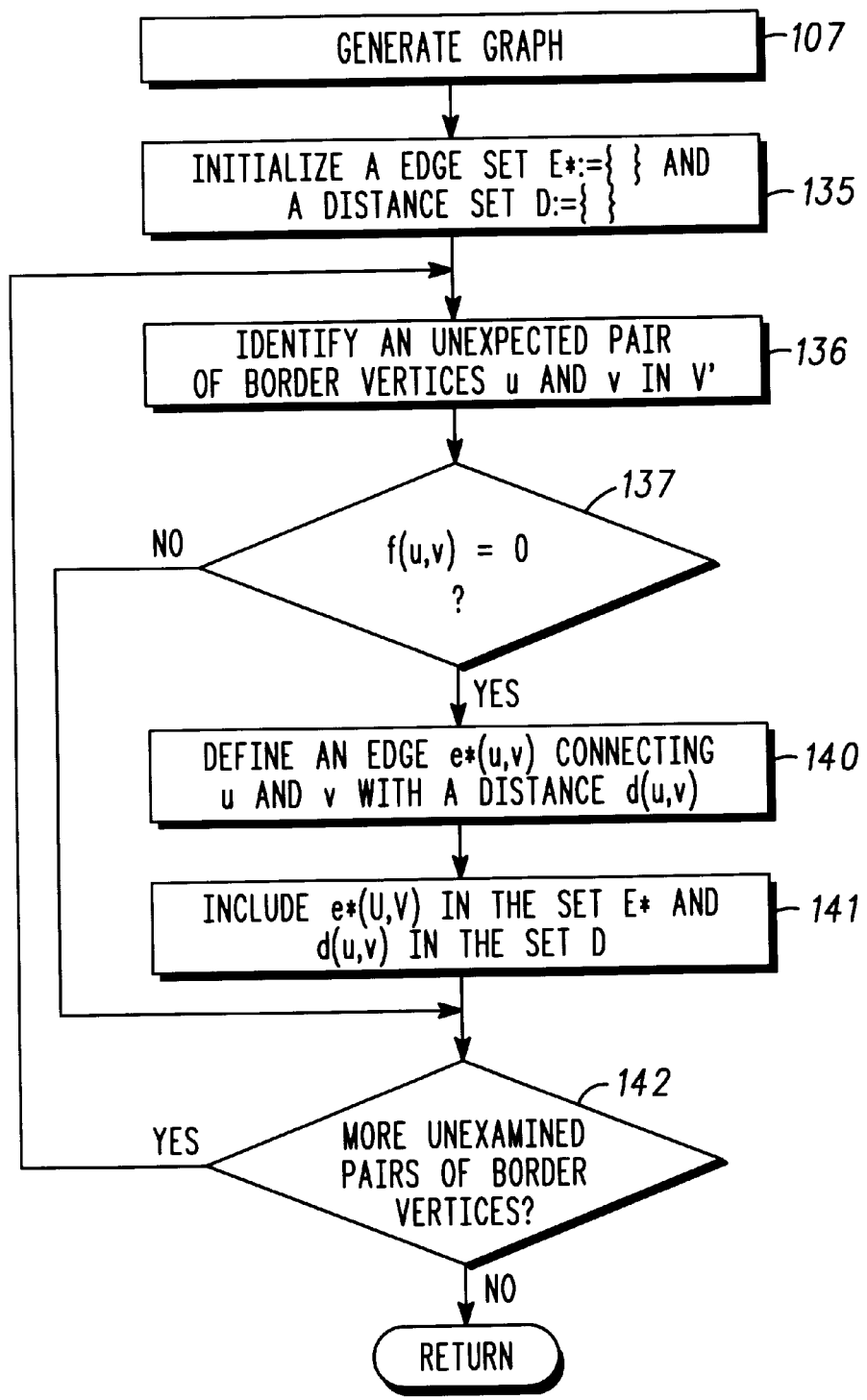

Once the phase two procedure 106 is complete, control transfers to the generate graph procedure 107 shown in FIG. 19. Step 135 initializes an edge set E* and a corresponding distance set, D. The procedure then begins a loop for analyzing each pair of border vertices. Step 136, as an initial step in the loop, identifies an unexamined pair of border vertices u,v in V'. In the context of FIG. 1 and using the information in FIG. 22, selecting vertices u=A and v=B retrieves information indicating that f(A,B)=0 so the path is in the first category. Consequently step 137 diverts to step 140, which defines an edge e*(A,B) with a distance d(A,B)=1. Step 141 includes the edge and corresponding distance values in the set E* and the set D, respectively.

Step 142, as a loop control, determines whether additional unexamined border vertices exist. On the context of FIG. 1, additional pairs do exist. If step 136 identifies the border vertex pair A,C, from FIG. 22, category flag f(A,C)=1 so the path is in the second category. So step 137 transfers control directly to step 142, bypassing steps 140 and 141. Consequently the edge A,C does not appear in the set E*.

The loop beginning with step 136 continues until all the unexamined pairs of border vertices 142 have been examined. In the case of FIG. 1, this requires twelve iterations of that loop. FIG. 23 depicts set E and set D. By inspection, it will be apparent that FIG. 23 therefore defines FIG. 3, which is the lossless compressed topology aggregation of FIG. 1.

The foregoing two embodiments of this invention have been described in terms of metrics. As previously indicated, metrics are additive characteristics, and it is the purpose of these embodiments to minimize the value of the characteristic over the path. Attributes generally are not additive. Rather, the attribute of one link in a path may be individually determinative of the attribute for the total path involving that link. For example, bandwidth through a path including multiple communications links or edges will be determined by the minimum bandwidth of an individual communications link or edge. Cell loss ratio, when implemented as a link constraint, is another similar attribute. These two particular attributes differ, however. It is the object of any analysis to select the path with maximum bandwidth, but with minimum cell loss ratio.

By way of example and using the numbers in FIG. 1 to represent increasing bandwidth, the bandwidth characteristic from A to C will be determined by the edge A,E and the edge E,C for a maximum value. Alternatively, the path from vertex A to vertex C through vertices F and E has the same minimum value (i.e., 2). However, the paths from vertex A to vertex C through vertices B and G or through vertices 8, H and D have a minimum bandwidth of one. Consequently, the path through the vertex E is the optimal path with a minimum bandwidth value of 2.

When cell loss ratio or a similar attribute is involved, the reverse occurs. Using the numbers in FIG. 1 to represent cell loss ratio, for example, the path from vertex A to vertex D through the vertices B and H would be an optimal path because it would introduce the minimum cell loss ratio.

The Dijkstra methodology of this invention and as shown in FIGS. 4 through 7 can readily accommodate attributes. For bandwidth, it is merely necessary to alter the steps 45, 46 and 47 in FIG. 6. By letting d'(u,v) be a bandwidth of a tentative maximum bandwidth path from vertex u to vertex v, and letting c(u,v) be the bandwidth associated with the edge from vertex u to vertex v, the test in step 45 is replaced by:

$$d'(u,w) \leq \min\{d'(u,v), c(v,w)\} \quad (5)$$

This indicates that the test is whether the existing path has a bandwidth less than that of the path involving an intermediate vertex, where the bandwidth of that path is given by the minimum bandwidth of the edges forming the path. Likewise, step 46 is modified to:

$$d'(u,w) = \min\{d'(u,v), c(v,w)\}$$

and step 47 is modified to:

$$d'(u,w) = \min\{d'(u,v), c(v,w)\} \quad (15)$$

Additionally, to accommodate bandwidth optimization, FIG. 5 requires one additional modification in step 43. In this particular case, the value for w* now is to determine an estimated bandwidth d'(u,w) that is a maximum value. In step 60, the "bandwidth" replaces "distance". With these changes, therefore, the analysis defines a lossless compressed topology aggregation for the bandwidth attribute.

By letting d'(u,v) be a cell loss ratio of a tentative minimum cell loss ratio path from vertex u to vertex v, and letting c(u,v) be the cell loss ratio associated with the edge from vertex u to vertex V, a similar analysis in which steps 45, 46 and 47 in FIG. 6 are modified to be d'(u,w)≧max{d'(u,v),c(v,w)}, d'(u,w)=max{d'(u,v),c(v,w)}, and d'(u,w):=max{d'(u,v),c(v,w)} respectively. Step 57 in FIG. 5 is not modified so a minimum value is obtained and "cell loss ratio" replaces "distance" in step 60 of FIG. 5. This will provide a lossless compressed topology aggregation for an attribute such as cell loss ratio. Similar modifications to the flows of FIGS. 16 through 19, particularly steps 113 and 115 in FIG. 17 and steps 126 and 130 in FIG. 18 will produce an analogous result.

Thus, the procedures as described with respect to FIGS. 4 through 7 and to FIGS. 16 through 19 define two methods for obtaining a lossless compressed topology aggregation for metrics such as administrative weight, delay and delay variation. If such metrics are to be advertised, then, as will be apparent, the procedure must repeat for each of the metrics. It will be apparent however, that the order of computational complexity for the modified Dijkstra and Floyd-Warshall methodologies is respectively either equivalent or less than the order of complexity for unmodified Dijkstra and Floyd-Warshall methodologies, as the number of border vertices is typically smaller than the total number of vertices in a peer group. This is particularly true for the modified Dijkstra procedure because the vertex analysis is limited to border vertices only.

Both methods provide a graph that reduces significantly the amount of topology data to be stored and broadcast. Similarly, it has been shown that both of these procedures can be modified to provide a lossless compressed topology aggregation for attributes that must be either maximized or minimized. Thus, this invention provides an approach for providing a topology aggregation that is more universal than prior art approaches.

What is claimed is:

1. A method for providing a substantially lossless compressed aggregation of a non-compressed topology representing a predetermined plurality of switching nodes interconnected by communication links in a data communication network, wherein the non-compressed topology has a plurality of paths each of which is formed by a tandem of communication links and wherein each communication link has a predetermined topology characteristic, said method comprising the steps of:

A) identifying border vertices among the predetermined plurality of switching nodes as those having communications links to switching nodes outside the predetermined plurality of switching nodes, and designating those remaining switching nodes among the predetermined plurality of switching nodes as interior vertices;

B) reducing the plurality of paths in the non-compressed topology by identifying an optimal path between each unique pair of said border vertices based upon the predetermined topology characteristic to create a plurality of optimal paths; and C) aggregating the plurality of optimal paths to provide for storage of, in at least one of the predetermined plurality of switching nodes, the substantially lossless compressed aggregation of the non-compressed topology spanning the border vertices of the non-compressed topology.

2. A method for providing a topology aggregation of a predetermined plurality of switching nodes in a data communication network interconnected by communication links, wherein each communication link has a predetermined topology characteristic, said method comprising the steps of:

A) identifying border vertices among the predetermined plurality of switching nodes as those having communications links to switching nodes outside the predetermined plurality, and designating those remaining switching nodes among the predetermined plurality as interior vertices, B) determining a non-redundant optimal path between each pair of said border vertices based upon the predetermined topology characteristic, wherein said step of determining the non-redundant optimal path comprises, for each pair of border vertices, comprises the steps of:

quantifying the predetermined topology characteristic of the communication links extending between the pair of border vertices;

iteratively processing alternate paths between the pair of border vertices to identify an optimal path therebetween;

testing each optimal path for redundancy with respect to previously determined optimal paths; and saving the optimal path unless the optimal path is redundant; and C) aggregating the non-redundant optimal paths to provide for storage of, at least one of the predetermined plurality of switching nodes, a substantially lossless compressed topology aggregation of the predetermined topology characteristic spanning the border vertices.

3. The method as recited in claim 2, wherein said alternate path iterative processing comprises the step of classifying each path into one of first and second categories, said testing step comprises the step of determining the path category therefor, and said saving step comprises the step of saving only those paths in the first category.

4. The method as recited in claim 3, wherein said alternate path iterative processing comprises the steps of obtaining a first value representing an estimated value of the topology characteristic between two vertices;

determining a second value representing the topology characteristic through an alternate path that includes at least one intermediate vertex; and replacing the estimated value with the second value as a new estimated value when the second value indicates that the alternate path is preferred.

5. The method as recited in claim 4, wherein said aggregating step comprises the step of retrieving corresponding values representing a topology characteristic corresponding to optimal paths between pairs of border vertices.

6. The method as recited in claim 5, wherein said step of aggregating further comprises generating a union of said retrieved corresponding values and thereafter transferring the union as the lossless compressed topology aggregation.

7. The method as recited in claim 2, wherein the predetermined topology characteristic is an additive metric and said iterative processing determines a shortest path from each border vertex to all other border vertices in determining an optimal path.

8. The method as recited in claim 2, wherein the predetermined topology characteristic is an additive metric and said iterative processing determines a shortest path between each pair of border and interior vertices in determining an optimal path.

9. The method as recited in claim 2, wherein the predetermined topology characteristic is an attribute and wherein at least one path includes an intermediate vertex, said iterative processing determining a minimum value of the attribute among paths between adjacent vertices along the path that includes the intermediate vertex and selecting an optimal path based upon a maximum attribute value for the alternate paths.

10. The method as recited in claim 2, wherein the predetermined topology characteristic is an attribute and wherein at least one path includes an intermediate vertex, said iterative processing determining a maximum value of the attribute among paths between adjacent vertices along the path that includes the intermediate vertex and selecting an optimal path based upon a minimum attribute value for the alternate paths.

11. A method for providing a substantially lossless compressed aggregation of a non-compressed topology having a plurality of paths between a plurality of border switching nodes in a ATM network, wherein the border switching nodes and additional interior switching nodes are interconnected by communication links, and wherein each combination of switching nodes and connected communication links has a predetermined topology characteristic, said method comprising the steps of:

iteratively, for each border switching node identified as a first border switching node,
determining an optimal path from the first border switching node to all other switching nodes in the peer group based on the predetermined topology characteristic to create a plurality of optimal paths;
segregating, during each iteration, each path from the first border switching node to a switching node in the peer group into a category when the path does not traverse a second border switching node as an intermediate node; and
aggregating the plurality of optimal paths in the category to generate a substantially lossless compressed aggregation for storage at the border switching nodes in the peer group.

12. The method as recited in claim 11, wherein said iterative determination of optimal paths includes the step of using a Dijkstra methodology for obtaining the optimal paths between border switching nodes and all other switching nodes.

13. The method as recited in claim 11, additionally comprising the step of identifying a parent switching node during each iteration.

14. The method as recited in claim 13, wherein one of said border switching nodes is designated as a root and said segregating step is performed conditionally on whether the parent switching node is a root or if the parent switching node is one of the interior switching nodes and the parent switching node is classified in the first category.

15. The method as recited in claim 14, additionally comprising the step of initializing, for each border switching node, a category flag, a parent flag and an estimated distance that is initialized to a value representing the predetermined topology characteristic between each pair of switching nodes.

16. The method as recited in claim 15, wherein said step of determining the optimal path includes comparing a present estimated distance with a sum of estimated distances from a first to a second switching node through an intermediate switching node.

17. The method as recited in claim 16, wherein, during each iteration, the parent flag for the intermediate switching node is updated if the present estimated distance is replaced.

18. The method as recited in claim 15, additionally comprising the step of setting the category flag to identify the first category if the parent switching node is a root or if the parent switching node is an interior switching node whose category flag identifies the first category.

19. The method as recited in claim 18, wherein said step of determining an optimal path includes the steps of comparing the present estimated distance with the sum of estimated distances; and when the present estimated distance and sum of estimated distances are equal, conditionally operating said setting step if the category flag of the intermediate switching node would be set were the parent switching node found to be the second switching node.

20. The method as recited in claim 19, wherein said aggregation step includes identifying, for each border vertex, paths to other border vertices ion which the category flag identifies the first category, generating a union of all such paths from all the border vertices and transferring the union to at least one of the border switching nodes.

21. A method for providing a substantially lossless compressed aggregation of a non-compressed topology having paths between a plurality of border switching nodes in a peer group of an ATM network, wherein the border switching nodes and additional interior switching nodes are interconnected by paths, each of which is formed by a tandem of communication links, and wherein each combination of switching nodes and connected communication links has a predetermined topology characteristic, said method comprising the steps of:

in a first phase, iteratively, for each pair of switching nodes in the peer group, determining a first estimated optimal path between the pair of switching nodes such that the path is permitted to include only interior switching nodes as intermediate switching nodes, in a second phase, iteratively, for each pair of border switching nodes in the peer group, determining a second estimated optimal path between the pair of border switching nodes such that the path is permitted to include other border switching nodes as intermediate switching nodes, and segregating, during each iteration, into a category, each path between two border switching nodes using another border switching node as an intermediate switching node, and aggregating the optimal paths in the category to generate the substantially lossless compressed aggregation for distribution to the border switching nodes in the peer group.

22. The method as recited in claim 21, wherein said iterative determination of optimal paths includes the step of using a Floyd-Warshall methodology for obtaining an optimal path between each pair of switching nodes.

23. The method as recited in claim 21, additionally comprising the step of identifying a parent switching node during each of said iterative determining steps.

24. The method as recited in claim 23, wherein said segregation into a second category is made during each second phase iteration when the estimated path between two switching nodes through an intermediate border switching node is less optimal than a previously estimated optimal path between these switching nodes.

25. The method as recited in claim 24, additionally comprising the step of initializing, for each pair of switching nodes in the peer group, a category flag, a parent flag and an estimated distance that is initialized to the predetermined topology characteristic between each pair of switching nodes.

26. The method as recited in claim 25, wherein said iterative determination of optimal paths includes comparing a present estimated distance with a sum of estimated distances from a first to a second switching node through an intermediate switching node.

27. The method as recited in claim 26, additionally comprising, during iterations of each of the first and second phases, replacing the parent flag whenever the present estimated distance is less than a previously determined distance between the first and second switching nodes.

28. The method as recited in claim 27, wherein said step of aggregating includes aggregating each optimal path between border switching nodes in which the category flag identifies the first category.

29. The method as recited in claim 1, wherein said step of reducing the plurality of paths in the non-compressed topology comprises, for each pair of border vertices, comprises the steps of:

quantifying the predetermined topology characteristic of the communication links extending between a pair of border vertices; and iteratively processing alternate paths between the pair of border vertices to identify the optimal path therebetween.

30. The method as recited in claim 29, additionally comprising:

testing each optimal path for redundancy with respect to previously determined optimal paths; and saving the optimal path unless the optimal path is redundant.

31. A method for providing a topology aggregation of paths between a plurality of border switching nodes in a peer group of an ATM network, wherein the border switching nodes and additional interior switching nodes are interconnected by communication links, and wherein each combination of switching nodes and connected communication links has a predetermined topology characteristic, said method comprising the steps of:

iteratively, for each border switching node, determining an optimal path from one border switching node to all other switching nodes in the peer group, wherein said iterative determination of optimal paths includes the step of using a Dijkstra methodology for obtaining the optimal paths between border switching nodes and all other switching nodes, and segregating, during each iteration, each path between two switching nodes in the peer group into a first of two categories when the path does not traverse a border switching node, and aggregating the optimal paths in the first category to generate a substantially lossless compressed topology aggregation for storage at the border switching nodes in the peer group.

32. A method for providing a topology aggregation of paths between a plurality of border switching nodes in a peer group of an ATM network wherein the border switching nodes and additional interior switching nodes are interconnected by communication links, and wherein each combination of switching nodes and connected communication links has a predetermined topology characteristic, said method comprising the steps of:

in a first phase, iteratively, for each interior switching node, determining a first estimated optimal path between all pairs of interior switching nodes in the peer group that are direct paths and that are paths involving only other interior switching nodes, in a second phase, iteratively, for each border switching node, determining a second estimated optimal path between all pairs of border switching nodes in the peer group that are pats involving other border switching nodes as intermediate switching nodes, and segregating, during each iteration, into a first of two categories, each path between two border switching nodes using another border switching node as an intermediate switching node, and aggregating the first and second optimal paths in the first category to generate a substantially lossless compressed topology aggregation for distribution to the border switching nodes in the peer group, wherein said iterative determination of optimal paths includes the step of using a Floyd-Warshall methodology for obtaining an optimal path between each pair of switching nodes.

* * * * *